United States Patent
Friederich et al.

(10) Patent No.: US 6,249,742 B1
(45) Date of Patent: Jun. 19, 2001

(54) METHOD AND SYSTEM FOR PROVIDING A PREVIEW OF A ROUTE CALCULATED WITH A NAVIGATION SYSTEM

(75) Inventors: Matthew Friederich, Berwyn; William McDonough, Glen Ellyn, both of IL (US); Richard Ashby, Blue River, WI (US)

(73) Assignee: Navigation Technologies Corp., Rosemont, IL (US)

( * ) Notice: Subject to any disclaimer, the term of this patent is extended or adjusted under 35 U.S.C. 154(b) by 0 days.

(21) Appl. No.: 09/597,507

(22) Filed: Jun. 20, 2000

Related U.S. Application Data

(62) Division of application No. 09/368,283, filed on Aug. 3, 1999, now Pat. No. 6,122,593.

(51) Int. Cl.[7] .................................................. G06G 7/78
(52) U.S. Cl. .......................... 701/202; 701/208; 701/25; 340/995
(58) Field of Search .................................. 701/200, 202, 701/208, 23, 25, 209; 707/1, 100, 102, 104; 340/995

(56) References Cited

U.S. PATENT DOCUMENTS

| | | | |
|---|---|---|---|
| 5,544,060 | 8/1996 | Fuju et al. | 364/444 |
| 5,559,707 | 9/1996 | DeLorme et al. | 364/443 |
| 5,953,722 | 9/1999 | Lampert et al. | 707/100 |

Primary Examiner—William A. Cuchlinski, Jr.
Assistant Examiner—Yonel Beaulieu
(74) Attorney, Agent, or Firm—Frank J. Kozak; Lawrence M. Kaplan

(57) ABSTRACT

A navigation system uses a geographic database to determine a solution route to a destination and provides detailed maneuvering guidance for following the solution route. In addition, the navigation system includes a preview function that provides a summary of the solution route prior to providing the detailed maneuvering guidance for following the solution route. The preview function is included in the programming of the navigation system. The preview function uses a feature incorporated in the geographic database wherein the portion of the geographic database used by the navigation system when determining a solution route includes references to another portion of the database that includes the actual text of the names of the roads represented thereby. As the navigation system uses the data in the geographic database to determine the solution route, data representing the roads in the solution route are saved, including the references to the other portion of the geographic database that includes the actual text of the names of the roads. After the solution route is determined, the preview function evaluates the data representing the roads in the solution route and provides a list of route preview data structures. The list of route preview data structures includes the references to the portion of the geographic database that includes the actual text of the names of the roads. The list of route preview data structures is used to provide the user of the navigation system with a preview that contains a summary of the solution route. The preview provided to the user can include the names of the roads in the solution route. The names can be obtained from the geographic database using the references contained in the list of route preview data structures. When obtaining the names, the references can be reordered to facilitate accessing the text of the names quickly. By providing a preview of the calculated route, the user is familiarized with the route prior to being given detailed guidance for following the route.

20 Claims, 17 Drawing Sheets

FIG. 6
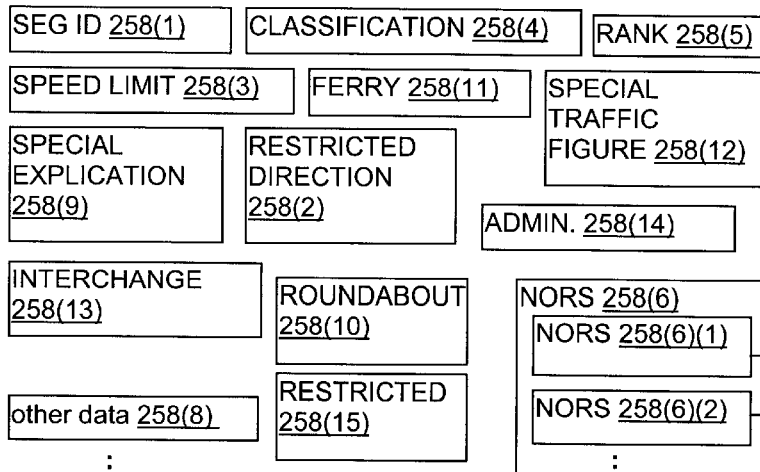
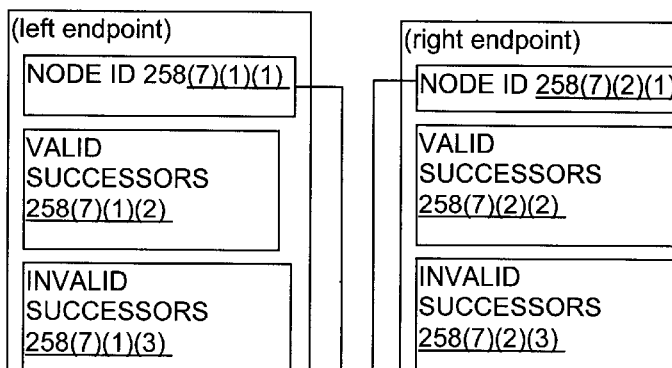
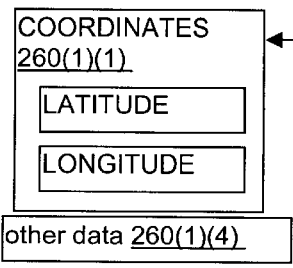
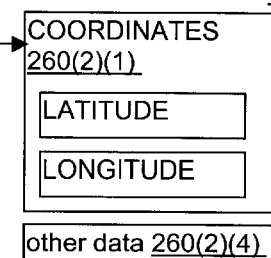

FIG. 17

ROUTING 236

SEGMENT DATA ENTITY 658

- SEG ID 658(1)
- RESTRICTED DIRECTION 658(2)
- RANK 658(5)
- SPEED LIMIT 658(3)
- CLASSIFICATION (e.g. controlled access, ramp . . . etc.) 658(4)
- other data 658(8)
- NAMES ON ROAD SIGNS text strings 658(6)

ENDPOINTS 658(7)

(left endpoint)
- NODE ID 260(7)(1)(1)
- VALID SUCCESSORS 658(7)(1)(2)
- VALID SUCCESSORS 658(7)(1)(3)

(right endpoint)
- NODE ID 260(7)(2)(1)
- VALID SUCCESSORS 658(7)(2)(2)
- VALID SUCCESSORS 658(7)(2)(3)

NODE DATA ENTITY 260(1)
- COORDINATES 260(1)(1)
  - LATITUDE
  - LONGITUDE
- other data 260(1)(4)

NODE DATA ENTITY 260(2)
- COORDINATES 260(2)(1)
  - LATITUDE
  - LONGITUDE
- other data 260(2)(4)

METHOD AND SYSTEM FOR PROVIDING A PREVIEW OF A ROUTE CALCULATED WITH A NAVIGATION SYSTEM

REFERENCE TO RELATED APPLICATION

The present application is a divisional of Ser. No. 09/368,283, filed Aug. 3, 1999, now U.S. Pat. No. 6,122,593.

BACKGROUND OF THE INVENTION

The present invention relates to providing previews of routes calculated with navigation systems used for vehicles that travel on roads.

Navigation systems are available for vehicles (such as automobiles, trucks, buses, and so on) that travel on roads. These in-vehicle navigation systems provide end users (such as drivers and/or passengers of the vehicles in which the navigation systems are installed) with various useful navigation-related features. For example, some navigation systems are able to determine an optimum route to travel by roads between locations in a geographic region. Using input from an end user and optionally from equipment that can determine one's physical location (such as a GPS system), programming in the navigation system can examine various routes between two locations to determine an optimum route to travel from a starting location to a destination location in a geographic region. The navigation system may then provide the end user with information about the optimum route in the form of instructions that identify the driving maneuvers required to be taken by the end user to travel from the starting location to the destination location. The instructions may take the form of visual and/or audio instructions that are provided along the way as the end user is traveling the route. On computer displays that are part of the navigation system hardware, some navigation systems are able to show detailed maps highlighting routes to destinations, the types of maneuvers to be taken at various locations along the routes, locations of certain types of features, and so on.

In order to provide these types of features, navigation systems use geographic data. The geographic data may be in the form of one or more databases that include data that represent physical features in a geographic region. The geographic databases may include data representing the roads and intersections in a geographic region and also may include information relating to the represented roads and intersections, such as turn restrictions at intersections, speed limits along the roads, street names of the various roads, address ranges along the roads, and so on.

Although navigation systems provide many important features, there continues to be room for improvements. One area in which there is room for improvement relates to providing a route preview feature. A route preview feature provides the end user with a preview of a calculated route. The preview may consist of an outline or summary of the calculated route. The outline or summary may include the names of the roads in the calculated route as well as a limited amount of other information. The route preview may be displayed or otherwise provided to the end user as text or graphically. The route preview does not include detailed maneuvering instructions for driving the route.

The route preview is presented to the end user just after the route has been calculated by the navigation system but before the end user has traveled far along the route. A preview of the calculated route affords the end user an opportunity to become familiar with the route in general before embarking on traveling the route. Some navigation systems may afford the end user a chance to reject the calculated route or possibly to modify the calculated route when the route preview is presented. For example, the end user may want to avoid a road in a calculated route known to have heavy traffic, construction delays, etc. Based upon the information in the route preview, the end user may request the navigation system to calculate an alternative route. Even if the end user does not request an alternative route, the end user may be more comfortable knowing the roads in the calculated route in advance of traveling the calculated route. Thus, providing the end user with a preview of a calculated route before the end user travels along the route can be a useful and desirable feature.

Although a route preview can be a desirable feature, it can be difficult to provide with some navigation systems. Some navigation systems have relatively limited computing resources, such as relatively limited memory, relatively slow I/O, relatively slow processors, etc.

One way to provide a route preview with a navigation system is to extract the names of the roads or other details from the maneuvering instructions generated by the route guidance function of the navigation system. As mentioned above, some navigation systems include a route guidance function that provides the end user with visual and/or audio maneuvering instructions that identify the maneuvers required to travel along the calculated route from the starting location to the destination location. The maneuvering instructions generated by the route guidance function may be very detailed, and accordingly substantial computing resources of the navigation system may be needed for generating and providing the maneuvering instructions. However, the maneuvering instructions are provided one at a time as the route is being driven. Thus, even a navigation system with relatively modest computing resources can provide an end user with rich, detailed maneuvering instructions because a relatively large amount of time is available to generate and provide the maneuvering instructions.

This aspect of the route guidance function can make it difficult to use the data from the maneuvering instructions generated by the route guidance function to provide a preview of the calculated route. Since the data which are needed for a route preview (i.e., names of roads and possibly other information) are embedded in the relatively complex maneuvering instructions generated by the route guidance function, generating the maneuvering instructions and then extracting the information needed for the route preview from the maneuvering instructions can require substantial computing resources. If the navigation system has relatively limited computing resources, providing a route preview feature in this manner can be relatively slow. Since a purpose of the route preview feature is to allow the end user to evaluate whether to accept the calculated route before embarking on the route, it is important that the route preview function operate relatively quickly even on navigation systems with limited resources. Thus, there is a need to provide a route preview function that operates quickly even on navigation systems with limited resources.

Some in-vehicle navigation systems have greater computing resources, e.g., more memory and faster I/O. Users of these types of in-vehicle navigation systems can also benefit from improvements that enable a preview of a calculated route to be generated quickly.

Navigation-related information and features can be provided on computing platforms other than in-vehicle navigation systems. Navigation application programs that provide navigation-related features are available on various kinds of computer hardware platforms and with various kinds of computer architectures. For example, navigation application programs may be provided on personal computers, including desktop computers and portable computers. Navigation application programs may also be provided on distributed systems, such as networks, including wireless networks and the Internet. Navigation application programs may also be included on hand-held computer devices, such as personal digital assistants, telephones, pagers, PalmPilot®-type devices, and so on. In addition, navigation application programs may be included on special purpose electronic devices, such as personal navigation systems. Users of navigation application programs installed on these types of platforms and systems can also benefit from improvements that enable a preview of a calculated route to be generated quickly.

Thus, there is a need to provide a route preview function with a navigation system or a navigation application program. There is also a need to provide a route preview function that operates quickly even on computing platforms that have relatively limited resources.

SUMMARY OF THE INVENTION

To address these and other objectives, the present invention comprises a preview function included in a navigation system. The navigation system uses a geographic database to determine a solution route to a destination and provides detailed maneuvering instructions for following the calculated solution route. The preview function provides a summary of the solution route prior to providing the detailed maneuvering instructions for following the solution route. The preview function is included in the programming of the navigation system. The preview function uses a feature incorporated in the geographic database wherein the portion of the geographic database used by the navigation system when determining a solution route includes references to another portion of the geographic database that includes the actual text of the names of the represented roads. As the navigation system uses the data in the geographic database to determine the solution route, data representing the roads in the solution route are saved, including the references to the other portion of the geographic database that includes the actual text of the names of the roads. After the solution route is determined, the preview function evaluates the data representing the roads in the solution route and provides a list of route preview data structures. The list of route preview data structures includes the references to the portion of the geographic database that includes the actual text of the names of the roads. The list of route preview data structures is used to provide the user of the navigation system with a preview that contains a summary of the solution route. The preview provided to the user can include the names of the roads in the solution route. The names can be obtained from the geographic database using the references contained in the list of route preview data structures. When obtaining the names, the references can be reordered to facilitate accessing the actual text of the names quickly. By providing a preview of the calculated route, the user is familiarized with the route prior to being given detailed guidance for following the route.

For purposes of this disclosure, a "navigation system" is understood to mean an navigation system installed in a vehicle (i.e., an in-vehicle navigation system). A "navigation system" is also understood to mean any software application installed on a computer platform that provides navigation-related features and uses geographic data, including applications that are installed on personal computers, networks, portable electronic devices, and so on.

BRIEF DESCRIPTION OF THE DRAWINGS

FIG. 6 shows components of one of the routing data records included in the routing data shown in FIG. 5.

FIG. 17 is a block diagram that shows components of a routing data record according to a first alternative embodiment.

DETAILED DESCRIPTION OF THE PRESENTLY PREFERRED EMBODIMENTS

I. Navigation System—Overview

Figure 1:
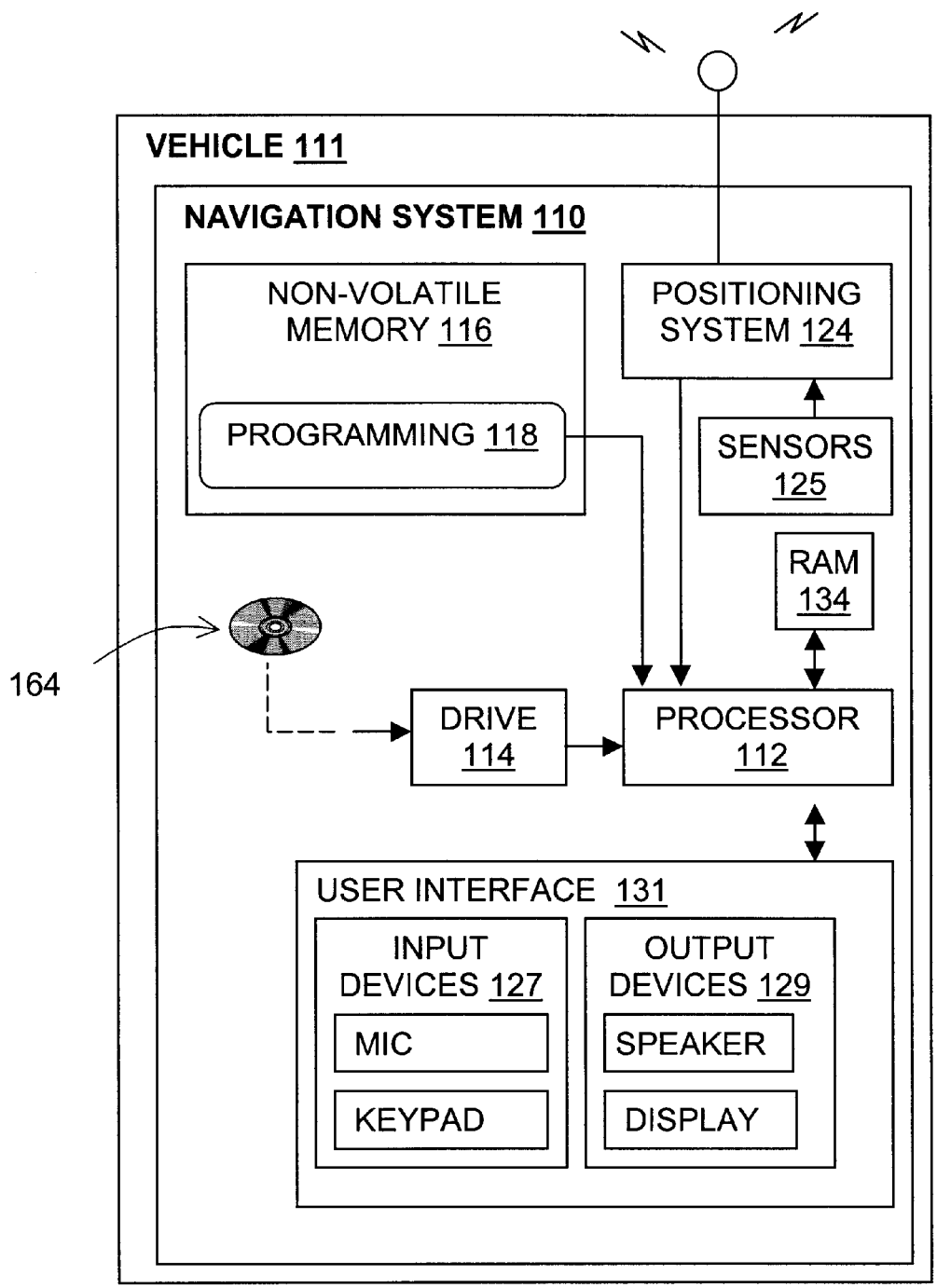
FIG. 1 is a block diagram illustrating a navigation system.

Referring to FIG. 1, there is a block diagram of a navigation system 110. The navigation system 110 is installed in a vehicle 111, such as a car or truck, although in alternative embodiments, the navigation system 110 may be located outside of a vehicle or may be implemented in various other platforms or environments, as described below. The navigation system 110 is a combination of hardware and software components. In one embodiment, the navigation system 110 includes a processor 112, a drive 114 connected to the processor 112, and a non-volatile memory storage device 116 for storing programming 118 and possibly other information. The processor 112 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, may also be suitable.

The navigation system 110 may also include a positioning system 124. The positioning system 24 may utilize GPS-type technology, a dead reckoning-type system, or combinations of these, or other systems, all of which are known in the art. The positioning system 124 may include suitable sensing devices 125 that measure the traveling distance, speed, direction, and so on, of the vehicle. The positioning system 124 may also include appropriate technology to obtain a GPS signal in a manner which is known in the art. The positioning system 124 provides an output to the processor 112. The output from the positioning system 124 is used by the software 118 that is run on the processor 112 to determine the location, direction, speed, etc., of the navigation system 110.

The navigation system 110 also includes a user interface 131. The user interface 131 includes appropriate equipment that allows the end user to input information into the navigation system. This input information may include a request to use the navigation features of the navigation system. For example, the input information may include a request for a route to a desired destination. The input information may also include other kinds of information. The equipment used to input information into the navigation system may include a keypad, a keyboard, a microphone, etc., as well as appropriate software, such as voice recognition programming. The user interface 131 also includes suitable equipment that provides information back to the end user. This equipment may include a display, speakers, or other means.

Figure 2:
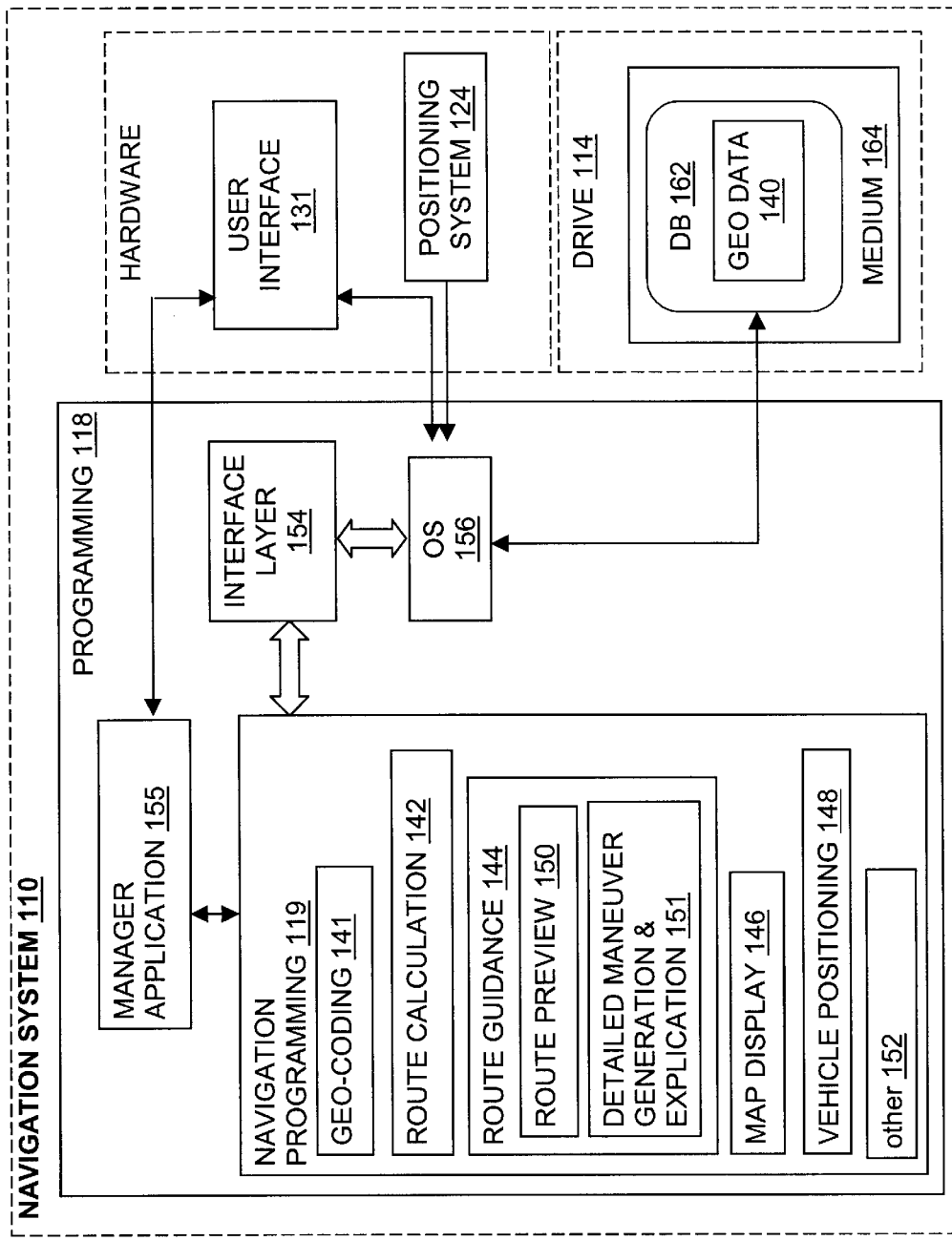
FIG. 2 is a block diagram showing more detail of some of the software components of the navigation system shown in FIG. 1.

Referring to FIGS. 1 and 2, the programming 118 may be loaded from the non-volatile memory 116 into a RAM 134 associated with the processor 112 in order to operate the navigation system. The programming 118 includes navigation-related application software 119 that provides for the navigating functions and features of the navigation system 110. The navigation-related application software 119 uses geographic data 140, possibly in conjunction with the output from the positioning system 124, to provide various navigation features and functions. The navigation-related application software 119 may include separate component applications (also referred to as programs, subprograms, routines, or tools) that provide these various navigation-related features and functions, FIG. 2 shows some of the component applications for one embodiment of the navigation-related software 119 included in the navigation system 110 of FIG. 1. These component applications may include geo-coding 141 (wherein geographic coordinates from the positioning system 124 are related to data representing features represented in the geographic data 140), route calculation 142, route guidance 144 (wherein detailed directions are provided for reaching a desired destination), map display 146, vehicle positioning 148 (wherein a vehicle position is related to the geographic data 140), and other functions 152. Other component applications, programs or tools may be included in the navigation programming 119.

In a present embodiment, the navigation application software 119 includes a route preview function 150. In this embodiment, the route preview function 150 is part of the route guidance application 144. The route preview function 150 is separate from the functions 151 that provide detailed maneuver instructions and explication as the vehicle is traveling along the route calculated by the route calculation application 142. The route preview function 150 is described in more detail below. In an alternative embodiment, the route preview function 150 may be provided as an application which is separate from the route guidance application 144.

The component applications of the programming 118 may work together through defined programming interfaces. The navigation-related application software 119 may access the geographic data 140 directly, or alternatively, the navigation application software 119 accesses the geographic data 140 through an interface layer 154 and operating system 156. The interface layer 154 and operating system 156 may be part of the programming 118 or may be provided separately. (One embodiment of an interface layer is described in Ser. No. 08/740,298, the entire disclosure of which is incorporated by reference herein.)

In addition to the navigation-related applications 119, the programming 118 may also include manager application software 155. The manager application software 155 provide interfaces to the hardware in the user interface 131 and the positioning system 124. The manager application software 155 may also coordinate requests for data from the navigation-related applications 119.

II. The Geographic Map Database
A. Overview.

The speed and/or functionality of a navigation system can be enhanced by improvements in the storage, arrangement, and/or structuring of the geographic data used by the system. Such improvements can facilitate the use of the data by those functions in the navigation-related applications in the navigation system that use the data. Based upon the manner in which the geographic data are stored, arranged, and/or structured, functions in the navigation-related applications 119 that access and use the data can implement routines that exploit the improvements incorporated into the geographic data. This combination can result in overall improved performance by the navigation system.

Referring to FIG. 2, the geographic data 140 are organized into one or more databases 162 and stored on a storage medium 164. The storage medium 164 is installed in the drive 114 so that the geographic data 140 can be read and used by the navigation system. The storage medium 164 may be removable and replaceable so that a storage medium with an appropriate database 162 for the geographic region in which the vehicle is traveling can be used. In addition, the storage medium 164 may be replaceable so that geographic data 140 on it can be updated easily. In one embodiment, the geographic data may be provided by Navigation Technologies Corporation of Rosemont, Ill. However it is understood that the inventive concepts disclosed herein are not restricted to any particular source of data.

In one embodiment, the storage medium 164 is a CD-ROM disk. In an alternative embodiment, the storage medium 164 may be a PCMCIA card in which case the drive 114 would be replaced with a PCMCIA slot. Various other storage media may be used, including fixed or hard disks, DVD disks or other currently available storage media, as well as storage media that may be developed in the future. The storage medium 164 and the geographic data 140 do not have to be physically provided at the location of the navigation system. In alternative embodiments, the storage medium 164, upon which some or all of the geographic data 140 are stored, may be located remotely from the rest of the navigation system and portions of the geographic data provided via a communications link, as needed.

The geographic database 162 contains information about the roadway network in the geographic region. In one embodiment, the geographic database 162 includes node data and segment data. These data represent components of the physical road network. Node data represent physical locations in the geographic region (such as roadway intersections and other positions) and segment data represent portions of roadways between the physical locations represented by nodes. Each road segment in the geographic region is represented by a road segment data entity (i.e., a record) in the geographic database 162. Each road segment data record in the database 162 is associated with two nodes which represent the coordinate positions at each end of the road segment represented by the road segment data record. The information included in the node and segment data entities is explained with reference to FIGS. 3, 4, and 6. (The terms "nodes" and "segments" represent only one terminology for describing these physical geographic features and other terminology for describing these features is intended to be encompassed within the scope of these concepts.)

Figure 3:
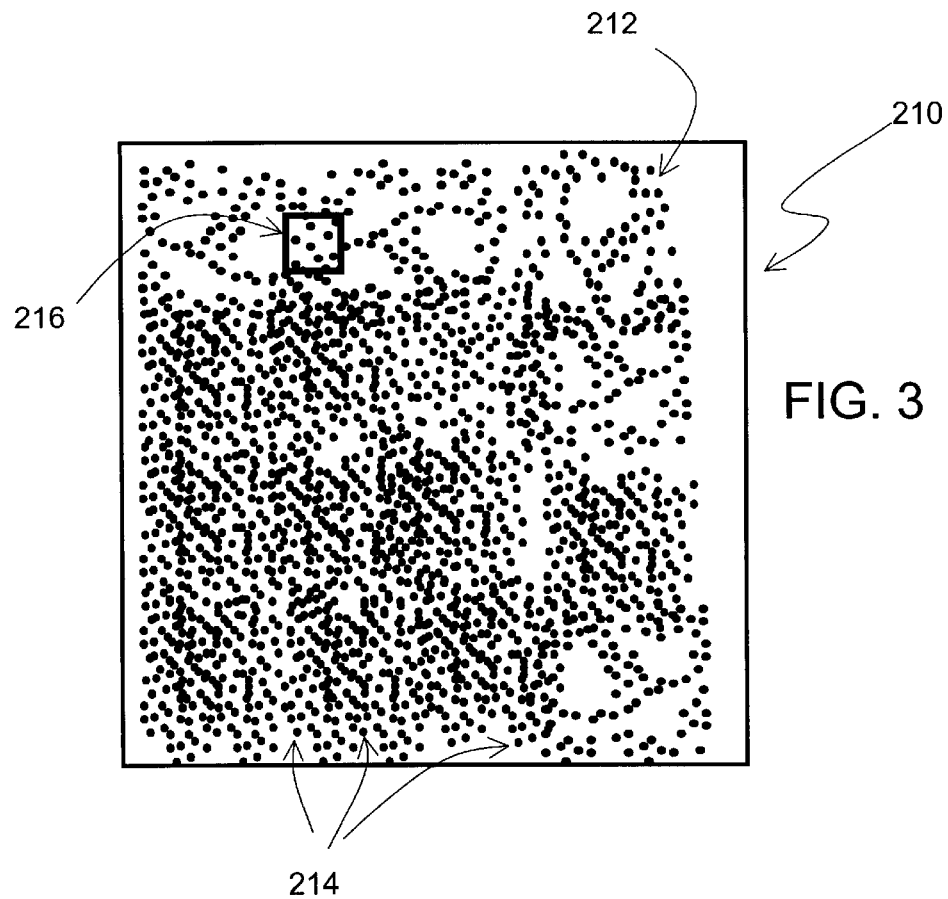
FIG. 3 illustrates a map showing a geographic region represented by the geographic database of FIG. 1.

FIG. 3 illustrates a map 210 of a geographic region 212. A plurality of locations 214 are shown to be located in the geographic region 212. Each of the locations 214 represents a place or point in the geographic area 212 at which there is located a feature about which it is desired to include information in the geographic database 162. Each of these locations 214 has a unique physical location (latitude, longitude, and optionally absolute or relative altitude) and each of the locations 214 can be uniquely identified by its two dimensional (or three dimensional) geographic coordinates, (i.e., latitude, longitude, and optionally altitude). A location 214 may correspond to an intersection at which two or more roads meet, a point along a road segment at which the direction of the road changes, a point along a road segment at which the speed limit changes, a point at which a road reaches a dead end, and so on. The location 214 may correspond to a position of a point-of-interest, such as a hotel or civic center, a boundary of a natural feature, such as a lake, or a position along a railroad track or ferry. The locations 214 may correspond to anything physically located in the geographic area 212.

Figure 4:
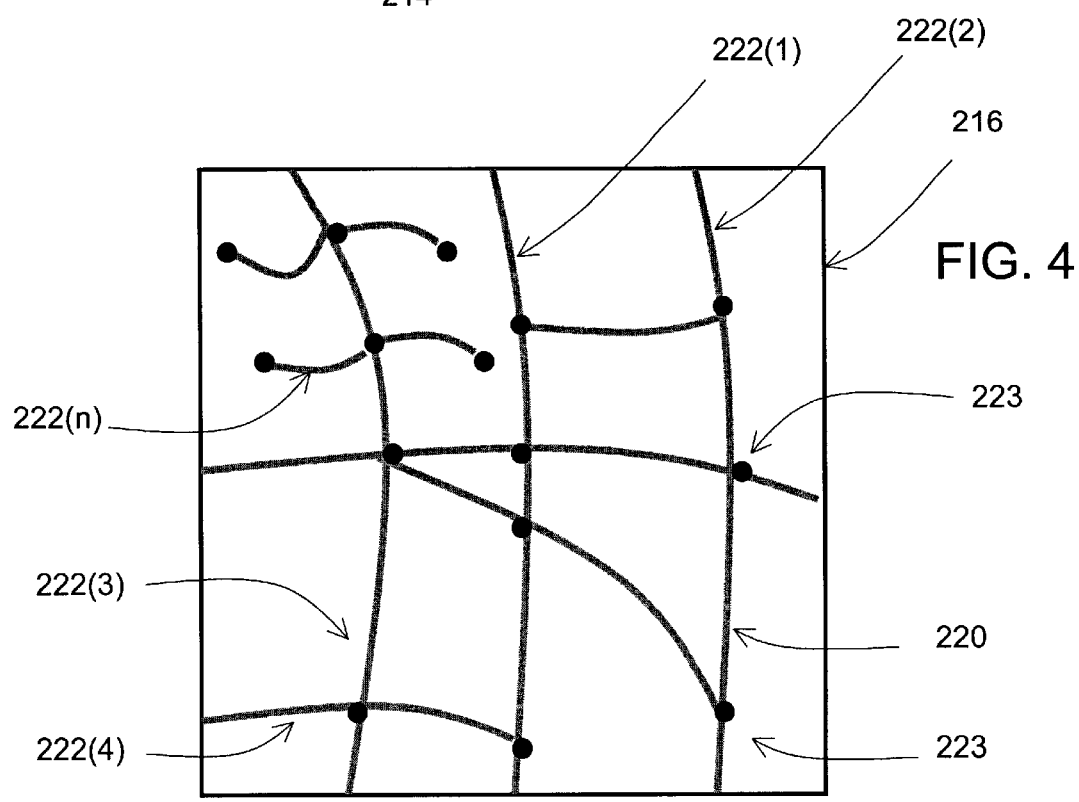
FIG. 4 shows an expanded view of a portion of the map of FIG. 3.

FIG. 4 shows an expanded view of a portion 216 of the map 210. The portion 216 in FIG. 4 illustrates part of the road network 220 in the geographic region 212. The road network 220 includes, among other things, roads and intersections located in the geographic region 212. As shown in FIG. 4, in the illustrated portion 216 of the map 210, each road in the geographic region 212 is composed of one or more segments, 222(1), 222(2) . . . 222(n). In one embodiment, a road segment represents a portion of the road. In FIG. 4, each road segment 222 is shown to have associated with it two nodes 223: one node represents the point at one end of the road segment and the other node represents the point at the other end of the road segment. The node at either end of a road segment may correspond to a location at which the road meets another road, e.g., an intersection, or where the road dead ends.

In one type of geographic database, there is at least one database entry (also referred to as "entity" or "record") for each road segment represented in a geographic region. A road segment data record 258 is shown in FIG. 6. This road segment data record may have associated with it information (such as "attributes", "fields", etc.) that allows identification of the nodes associated with the road segment and/or the geographic positions (e.g., the latitude and longitude coordinates) of the two nodes. In addition, the road segment record may have associated with it information (e.g., more "attributes", "fields", etc.), that specify the speed of travel on the portion of the roadway represented by the road segment record, the direction of travel permitted on the road portion represented by the road segment record, what turn restrictions exist at each of the nodes which correspond to intersections at the ends of the road portion represented by the road segment record, the street address ranges of the roadway portion represented by the road segment record, the name of the road, and so on. The various attributes associated with a road segment may be included in a single road segment record, or preferably are included in more than one type of road segment record which are cross-referenced to each other.

In a geographic database that represents the region 212, there may also be a database entry (entity or record) for each node in the geographic region. Node data records 260 are shown in FIG. 6. The node data record may have associated with it information (such as "attributes", "fields", etc.) that allows identification of the road segment(s) that connect to it and/or its geographic position (e.g., its latitude and longitude coordinates).

B. Separate subsets of geographic data

One way that the accessing of geographic data can be enhanced for performing various navigation-related functions is to provide separate collections or subsets of the geographic data for use by each of the separate functions performed by the navigation-related applications (119 in FIG. 2). Each of these separate subsets is tailored specifically for use by a particular one or more of the functions. For instance, the route calculation function 142 normally uses only a portion of all the information in the geographic database 162 that is associated with a segment of a road. When the route calculation function 142 is being run, it may require information such as the speed along a road segment, turn restrictions from one road segment to another, and so on. However, the route calculation function 142 does not necessarily require the name of the road to calculate a route. Similarly, when using the map display function 146, some of the information associated with a road segment, such as the speed limits or turn restrictions, is not required. Instead, when the map display function 146 is run, it uses only a portion of the information associated with the road segment, such as the shapes and locations of roads, and possibly the names of the roads. Even further, when the route guidance function 144 is being run, some of the information associated with a segment of a road, such as the speed and turn restrictions, is not required. Instead, when the route guidance function 144 is being run, it uses information that includes the name of the road represented by the road segment, the address range along the road segment, any signs along the road segment, and so on. Although there may be some overlap as to the types of information used by the various navigation functions, some of the data used by any one of these navigation functions is not used by another of the functions. If all the information relating to each road segment were associated with it as a single data entry in a single database, each data entity record would be relatively large. Thus, whenever any one of the navigation functions 119 accessed an entity record, it would have to read into memory a significant amount of information much of which would not be needed by the navigation function. Moreover, when reading the data entity from the medium 164, relatively few data entities could be read at a time since each data entity would be relatively large.

In order to provide the information in the geographic database 162 in a format more efficient for use by each of the navigation functions 119, separate subsets of the entire geographic database 162 for a given geographic region are provided for each of the different types of navigation functions 119.

Figure 5:
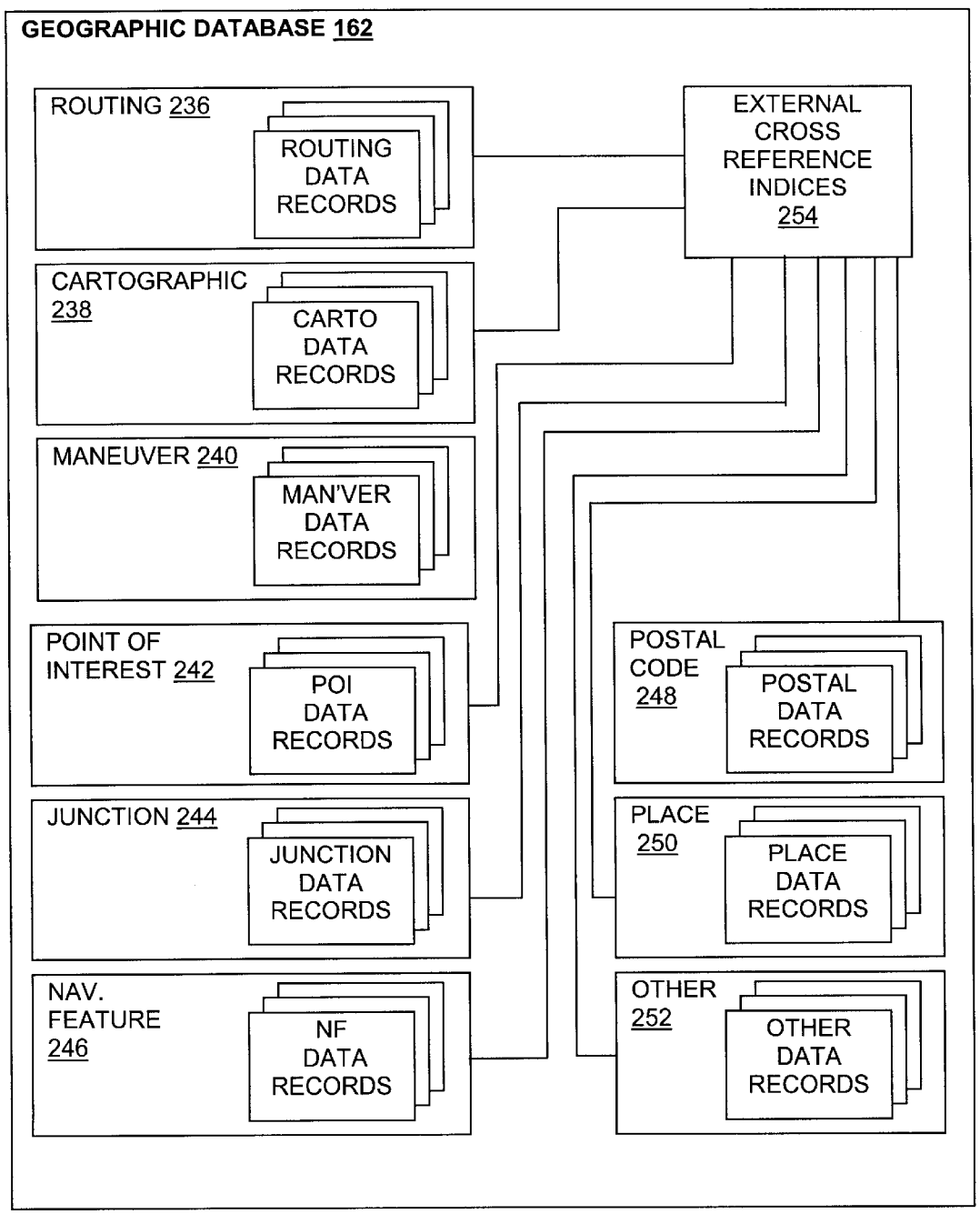
FIG. 5 is a diagram illustrating the different types of data included in the geographic database of FIG. 1 for use with various navigation application functions.

FIG. 5 illustrates a diagram of the geographic database 162. The geographic database 162 is comprised of separate sets of routing data 236, cartographic data 238 (for map display), maneuver data 240 (for route guidance), point-of-interest data 242 (for identifying specific points of interest, such as hotels, restaurants, museums, stadiums, airports, etc.), junction data 244 (for identifying named intersections), navigation feature name data 246 (identifying the actual names of roads and other geographic features), postal code data 248, and place data 250 (identifying administrative places, such as municipalities, states, counties, and so on). The geographic database 162 may also include data subsets for other types of data 252.

Each subset of data includes only the data required to be used by a particular navigation function. Thus, the routing data includes the data attributes relating to navigation. The cartographic data includes data attributes relating to displaying maps. The maneuver data includes the attributes relating to explicating a route (e.g., route guidance). There is some overlap of data between each of these subsets, with the result that some parts of the data may be included in more than one subset. For example, both a road segment data entity in the routing data subset 236 as well as a road segment data entity in the cartographic data subset 238 may include attributes identifying the nodes located at the ends of the segments. Although this duplication may result in a larger overall data storage requirement, each of the navigation functions benefits from the resultant efficiency of handling smaller amounts of data.

Providing for separate subsets of geographic data for each of the navigation functions also takes into account that usage of each of these navigation functions relates to the others of the functions in expected ways. For example, an end user may first want to view a present position, then enter a destination, then receive instructions how to start toward the destination, then observe a map showing the initial portion of the route, then receive further instructions, then have a map displayed of the next portion of the route, and so on. Because of this type of expected usage, dividing the data into subsets provides for efficient use of the data when using each separate function.

Although the division of the geographic data into subsets provides for efficient use of the data by each of the different navigation functions, it becomes necessary to provide that the different navigation-related functions that use these different subsets of the database work together. For example, in the example described above, after an end user obtains a calculated route, it may be desired to display a map on the display of the user interface with the calculated route highlighted. In order to accomplish this, the routing subset 236 of geographic data is accessed first to obtain the routing road segment data entities for the optimum route, and then the cartographic subset 238 of the geographic data is accessed to obtain the cartographic road segment data entities corresponding to the routing data entities. To permit these data subsets to work together, indices may be included that provide cross references, search trees, or other data finding techniques. Indices can be located within any of the subsets of data or external of any of the subsets. In FIG. 5, external indices 254 are shown. Storing indices external of the data that are being indexed has the advantage that the index can be loaded and used to determine which data among the various subsets of data needs to be loaded next.

Referring again to FIG. 6, there is shown two kinds of data records that are included in the routing data 236 shown in FIG. 5. FIG. 6 shows components of a routing data record (or entity) 258 and two node data records (or entities) 260(1) and 260(2). The road segment record 258 includes a segment ID 258(1) by which the data record can be identified in the geographic database 162. The road segment data record 258 may also include data 258(2) that indicates the restrictions, if any, on the direction of vehicular travel permitted on the represented road segment. The road segment data record 258 includes data 258(3) that indicates a speed category (i.e., the maximum permitted vehicular speed of travel on the represented road segment). The road segment data record 258 may also include data 258(4) indicating whether the represented road segment is part of a controlled access road (such as an expressway), a ramp to a controlled access road, and so on. The road segment data record 258 may also include data 258(5) that indicates a rank of the represented road segment. (A rank of a road segment may correspond to its functional class. For example, road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.)

The road segment data record 258 also includes data indicating the name or names of the represented road segment, if a name for the road segment should exist. In one embodiment, the road segment data record 258 includes one or more references 258(6) to one or more corresponding data records included in the navigable feature data subset 246. Roads may be known by more than one name. The geographic database 162 may include in the navigable feature name data subset 246 all the names by which each road is known. This allows the end user to specify any name by which a road is known as a desired destination. However, in the present embodiment, not all the names by which a road is known are referenced by the road segment data record 258. Instead, the one or more references 258(6) in the routing data segment record 258 point to only the names used on road signs that refer to the road segment. More specifically, in a present embodiment, the reference(s) 258(6) in the road segment data record 258 include one or more ID's that point to or otherwise identify the records in the navigable feature name data 246 that include the name(s) by which the represented road segment is referred to by any road signs along the represented road segment. Names on road signs are used because these names may be the names by which the roads are most well known. In addition, names on road sign are used because these are the names that drivers would encounter while driving. (If the road segment represented by the road segment data entity 258 does not have a name, there is no reference to a record in the navigation feature data 246.)

The road segment data record 258 also includes data 258(7) providing the geographic coordinates (e.g., the latitude and longitude) of the endpoints of the road segment. In one embodiment, this data 258(7) is a reference to the node data records 260(1) and 260(2) that represent the nodes corresponding to the endpoints of the represented road segment.

Also associated with the road segment data record 258 are data 258(7)(1)(2) and 258(7)(2)(2) indicating the valid successor segments, if any, at each endpoint of the road segment and data 258(7)(1)(2) and 258(7)(2)(2) indicating the invalid successor segments, if any, at each endpoint of the road segment. The valid successors are those other segments that connect to the node and to which vehicular travel is permitted across the node and the invalid successors are those other segments that connect to the node and to which vehicular travel is not permitted across the node.

The road segment record 258 may also include data 258(9) indicating whether the segment is associated with a special explication, data 258(10) indicating whether the segment is part of a roundabout, data 258(11) indicating whether the segment is part of a ferry, data 258(12) indicating whether the segment is part of a special traffic figure, data 258(13) indicating whether the segment is part of a highway interchange, data 258(14) indicating the administrative area (e.g., city, state, etc.) in which the represented road segment is located, and data 258(15) indicating whether the segment has a vehicle restriction (e.g., no trucks, no taxis, etc.)

The road segment record 258 may also include or be associated with other data 258(8) that include or refer to various other attributes of the represented road segment. The various attributes associated with a road segment may be included in a single road segment record, or may be included in more than one type of record which are cross-referenced to each other.

Figure 7:
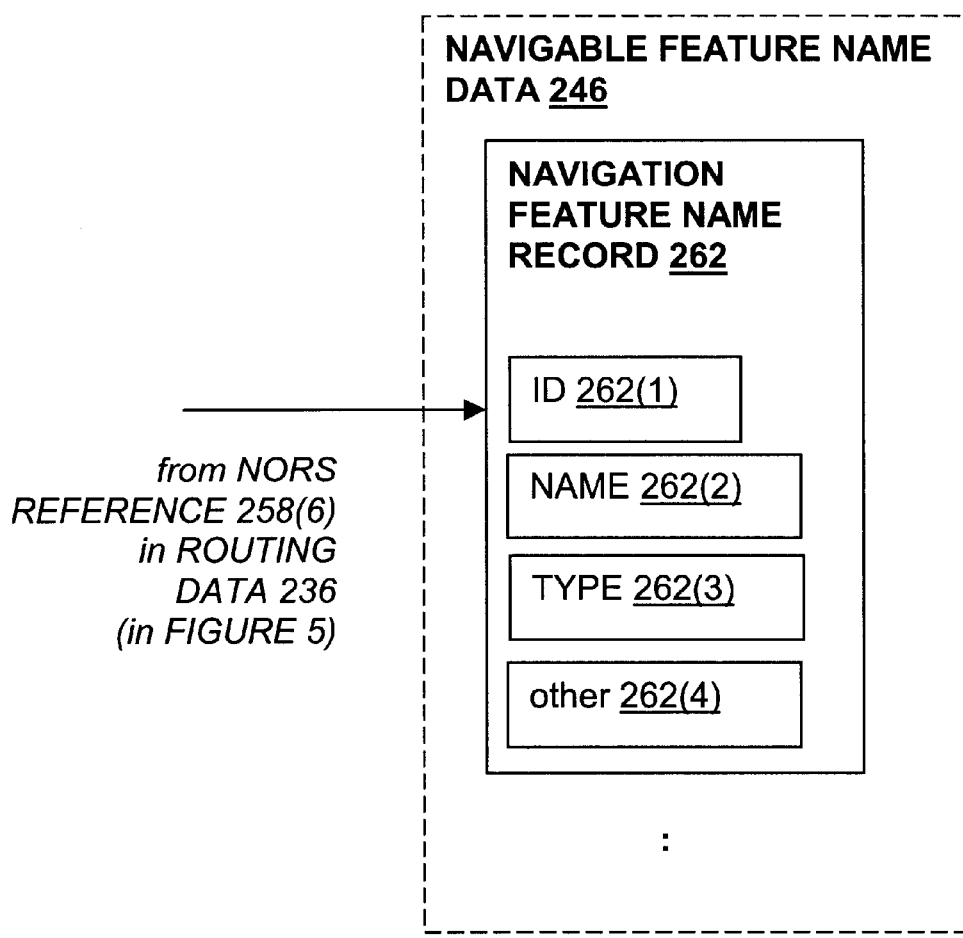
FIG. 7 shows components of one of the navigable feature data records included the navigable feature data shown in FIG. 5.

FIG. 7 shows components of one of the navigable feature name data records 262 included in the navigable feature data 246 shown in FIG. 5. A first data component of the navigation feature name record 262 is a navigation feature name ID 262(1). The navigation feature name ID 262(1) is a unique number associated with the navigation feature name record 262 in the geographic database 162. The navigation feature name record 262 also includes a data component 262(2) that contains the name for the feature represented by the navigation feature name record 262. In the case of a navigation feature name record 262 referenced by a name on road sign attribute 258(6) this data component 262(2) includes the name by which the represented road segment is referred to by any road signs along the represented road segment. For example, if a name on a road sign along a represented road segment is "HIGGINS", the data component 262(2) of the navigation feature name record 262 referenced by the name on road sign reference 258(6) in the routing segment data record 258 that represents this named intersection includes the text "HIGGINS."

Another data component 262(3) of the navigation feature name record 262 indicates the type of feature to which the name (included in the name field 262(2)) refers. If the navigation feature name record 262 refers to the name of a road, this data component 262(3) indicates that the navigation feature name record 262 represents a name for a "road." Navigation feature name records 262 are also used to represent the names of other kinds of named features, such as intersections, ferries, and so on. (Data records that represent these other kinds of features may also refer to navigation feature name records in order to obtain the name of the represented feature.) Each navigation feature name record 262 may also include other data components 262(4).

C. Layering of geographic data

Another way that the geographic data can be organized to enhance their use is to provide the data in layers. Some of the navigation functions, such as the map display function 146 and the route calculation function 142, may use data at different levels of detail. For example, when using the map display function 146, it is sometimes desired to provide for panning and zooming. Zooming can be done more efficiently if the map display data 236 are organized into layers, with greater detail at the lower layers and less detail at the higher layers. Likewise, when using the route calculation function 142, it is also advantageous to use the data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data 236 are layered, higher layers that omit secondary roads can be used when possible to minimize the number of possible road segments to be investigated when calculating the route. Therefore, within some of the subsets of data types, the geographic data are provided in separate collections or groups corresponding to separate layers.

Layering can be implemented by using the rank of the road segment, described above. The rank of a road segment can be used to specify the highest data layer in which a road segment entity that represents the road segment is included. For example, referring to FIG. 8, the routing type data 236 may include five separate layers of the data, R0, R1, R2, R3, and R4, each comprising a separate collection of the routing data with a different level of detail, which can be used by the route calculation function 142. In the routing data 236 of the geographic database, layer 0 ("R0") includes the road segment data entities having a rank of "0" or higher. Thus, layer 0 includes road segment data entities corresponding to all the portions of all the roads in the geographic region. Layer 1 of the routing data 236 comprises a separate subset (or collection) of the routing data and includes only the routing segment data entities (and some or all of their corresponding routing data attributes) having a rank of "1" or higher. Layer 2 of the routing data comprises a separate subset of the routing data and includes only the routing segment data entities (and some or all of their corresponding navigation data attributes) having a rank of level 2 or higher, and so on. A highest layer (layer n) includes only records having a rank of n. In a present embodiment, n is equal to 4, although in other embodiments, n may be any number greater than 0. Each higher layer includes fewer records, however these records represent roads upon which travel is generally faster.

Similarly, the other types of data may include separate layers of data, each with a different level of detail. For example, the cartographic data type 238, which is used by the map display function 146, may be provided in multiple layers. Using different layers of cartographic data 236, the map display function 146 can provide rapid panning and zooming.

Figure 8:
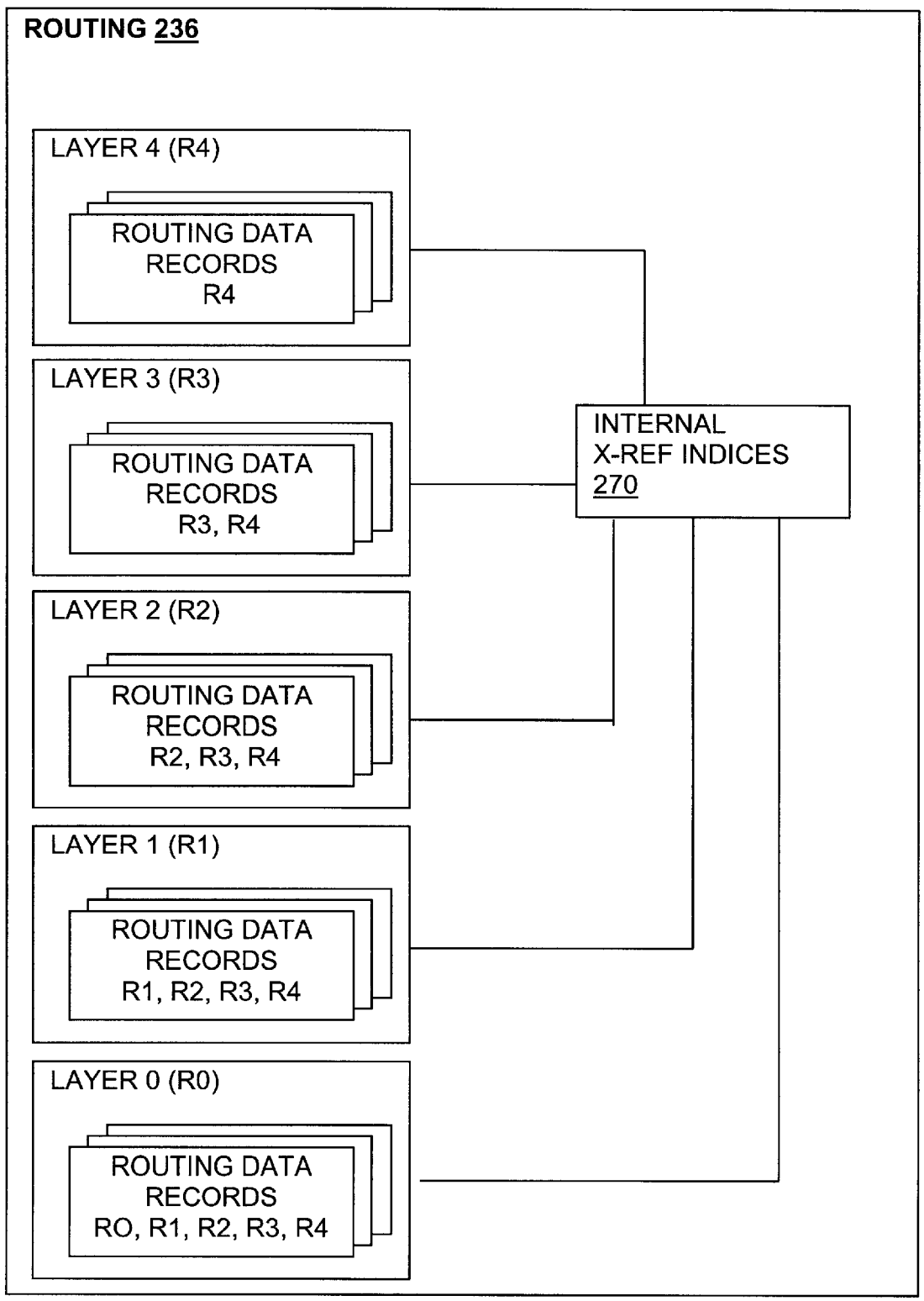
FIG. 8 is a diagram illustrating separate layers of data in the routing data shown FIG. 5.

The organization of some of the data into layers results in some duplication of the data. For example, in the embodiment of FIG. 8, routing data records that represent road segments having a rank of "4" are included five separate layers of the routing data. However, the increased efficiency provided by layering generally offsets any disadvantages. As with the use of separate types of data mentioned above, the need arises to allow these layers to work together. Indices may be provided for this purpose. In FIG. 8, internal indices 270 are shown. Internal indices 270 are included among the various types of data. External indices may also be used for this purpose.

D. Spatial organization and access to geographic data

Organizing the data into subsets or types provides separate collections of the data in sizes that are more manageable by each of the functions in the navigation-related applications 119. With respect to some subset types, the data can be further organized to facilitate spatial access.

Several of the navigation functions among the navigation applications 119 in FIG. 2 may access or use the geographic data spatially. One way this arises is that a navigation application function uses data entities in the geographic database 162 based upon the physical location of the geographic feature represented by the data entity in the geographic region. For example, a function may require finding the data entities that represent all the road segments that connect to a road segment represented by a given data entity. Another way that spatial access arises is when a function in a navigation-related application requires finding several or all of a type of data records that represent features located close to a location in the geographic region or within a defined area in the geographic region.

Referring again to FIG. 5, some of the subsets of geographic data are organized spatially and other subsets of data are organized in a manner other-than-spatially. Spatially-organized data are arranged so that the data that represent geographically proximate features are located logically and/or physically proximate in the database 162 and/or on the medium 164. For some of the navigation application functions, spatial organization of their respective data provides for reading closely related geographic data from the medium more quickly and loading related geographic data into memory where they can be used. This kind of organization minimizes accessing of the storage medium 164 and speeds up operation of these navigation functions.

The subsets of the geographic data 140 that are organized spatially include the route calculation data 236 and the cartographic data (map display) 238. Other kinds of data may also be organized spatially. Spatial organization can be applied to the data in different ways. For example, spatial organization can be applied to each record of data or can be applied to groupings of pluralities of data records (e.g., such as parcels of data, as explained below).

Some of the subsets of the data are organized and accessed in ways other than spatially. For example, some of the subsets of data may be organized alphabetically, or by city, state, and country, and so on. The non-spatially organized data include the junction data 244, the navigable feature name data 246, the point of interest data 242, the postal code data 248, and the place data 250. Other types of data may also be organized non-spatially.

E. Parcelization of geographic data

There are several factors that can affect the operation and performance of a navigation application program when using geographic data. In order to provide a reasonably high level of functionality, a relatively large database may be provided. Storage media, such as CD-ROM disks, DVD disks, or PCMCIA cards, are capable of handling databases of the size and complexity sufficient to provide suitable functionality. However, accessing these types of media can be relatively slow. Because navigation systems may be installed in vehicles or may be hand-held, the hardware resources of the navigation system may be limited. Navigation systems installed in vehicles or hand-held units may have limited memory resources and relatively slow media access rates. Even when navigation applications are provided on platforms that have greater memory and hardware resources, similar considerations apply, but on a different scale.

Assuming that all the data records for a given entire geographic region cannot be loaded into the memory of the navigation system at the same time due to limited memory resources of the navigation system, it is desirable to load into memory only those data that are needed to perform a desired function. In order to accomplish this, data in the geographic database 162 are organized into parcels. A parcel of data is established to contain data records that are obtained together in a single access of the medium. This may relate to the quantity of data that can be accessed in a single disk access, although it may be related to some other factor. For some types of media such as a CD-ROM disks, a parcel may be established to be a 16 Kilobyte quantity of data. (Other sizes of data may be used including 1 K, 2 K, 4 K, 8 K, 32 K, and so on.)

Figure 9:
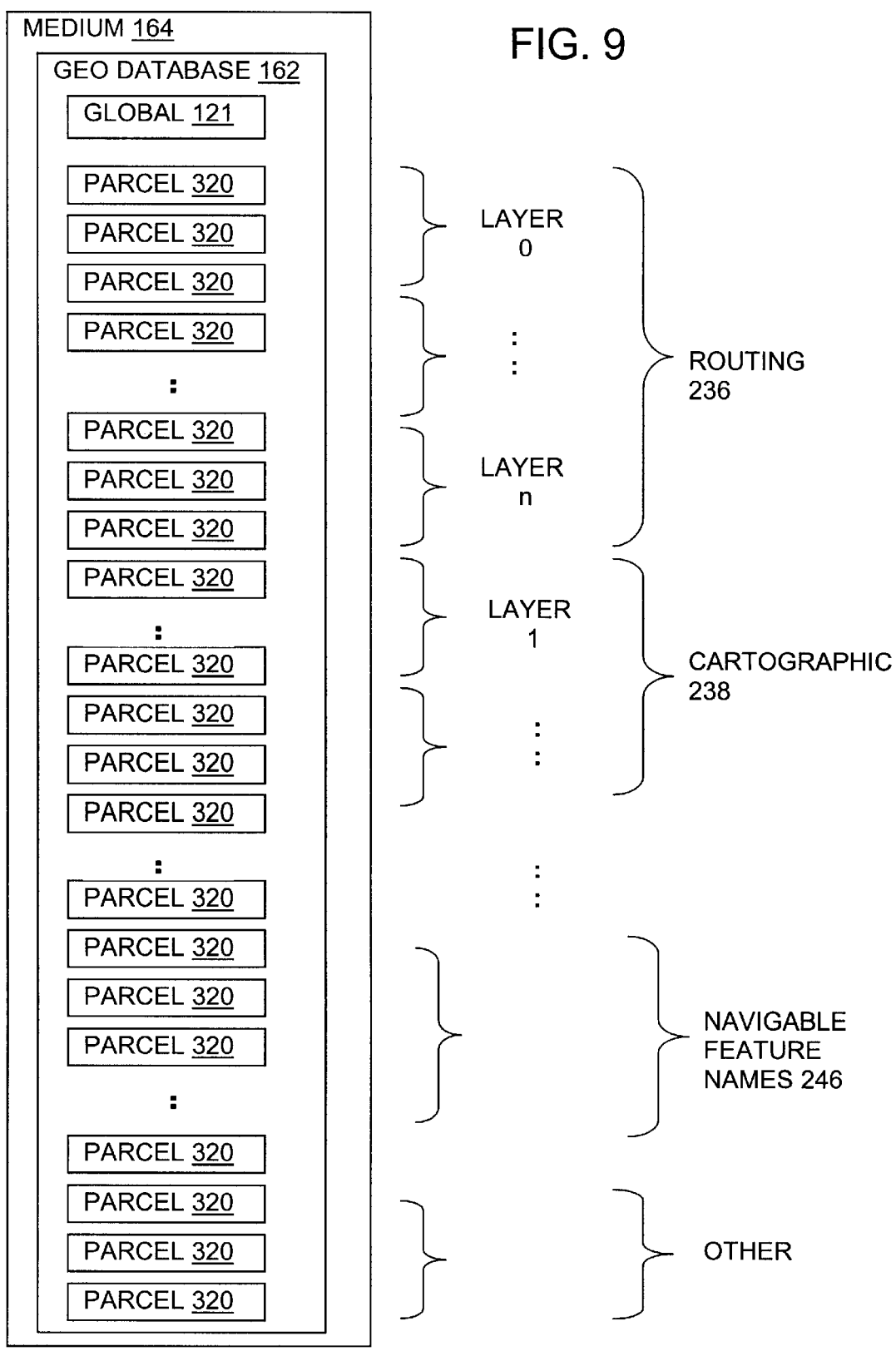
FIG. 9 is a diagram showing the arrangement of parcels of data in the geographic database of FIG. 1.

As shown in FIG. 9, parcels 320 of data are stored to form the database 162 so that the data in each parcel 320 are logically and/or physically grouped together. When a parcel of data is accessed, all of its data records are read from the medium into the memory of the navigation system at the same time. Prior to forming the data into parcels, the data are first separately organized into the different types (e.g., routing, cartographic, maneuver, and so on, as shown in FIG. 5). In addition, for those types of data that are organized by layer (e.g., routing, cartographic), these types of data are separately organized into layers (as shown in FIG. 8) prior to forming the data into parcels.

(1). Parcelization of spatially organized data.

In parcelizing data, it is preferable generally to form parcels of data in a manner that minimizes the number of parcels that have to be accessed and read in order to perform a navigation function. As mentioned above, it is sometimes desirable to store the data representing geographic features based upon the physical proximity of the features represented thereby. With respect to the spatially organized data, it would be advantageous to provide a means to load data into memory based generally upon the physical geographic locations of the features which the data represent or upon the geographical proximity of the features which the data represent. This can be done by parcelizing the data spatially. Spatially-parcelized data are arranged so that the data that represent geographically proximate features are located logically and/or physically proximate in the database 162 and/or on the medium 164. For some of the navigation application functions, spatial parcelization of their respective data provides for reading closely related geographic data from the medium more quickly and loading related geographic data into memory where they can be used. This kind of organization minimizes accessing of the storage medium 164 and may speed up operation of these navigation functions.

There are a number of different procedures that can be used for parcelizing geographic data spatially. For example, a simple parcelization method may provide for separating the geographic data into a plurality of parcels wherein the data in each parcel represent features encompassed within a separate one of a plurality of regular sized rectangles which together form a regular, rectangular grid over the geographic region. Another method for spatial parcelization is to separate the data into parcels encompassed within rectangular areas where each of the rectangles is formed by a bisection of rectangles encompassing parts of the region until a parcel size below a maximum threshold is obtained. In addition, parcelization procedures are disclosed in the copending application Ser. No. 08/740,295, filed Oct. 25, 1996, the entire disclosure of which is incorporated by reference herein, and parcelization procedures are also described in the copending patent application Ser. No. 08/935,809, filed Sep. 5, 1997, the entire disclosure of which is incorporated by reference herein. Still other methods of parcelization to which the disclosed subject matter can be applied are described in U.S. Pat. Nos. 4,888,698 and 4,937,572.

Figure 10:
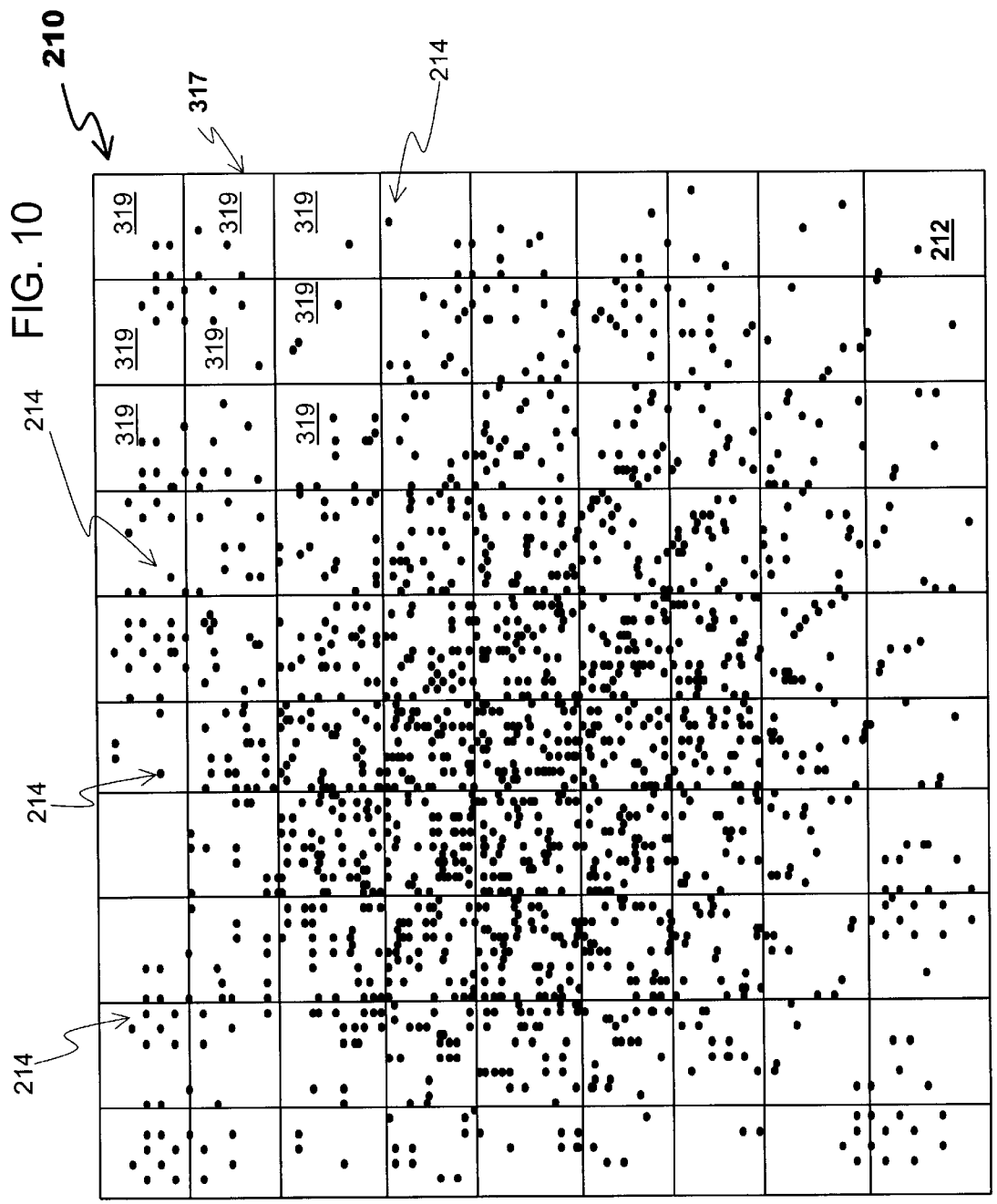
FIG. 10 shows a map of the geographic region of FIG. 3 illustrating application of a parcelization method to spatially organized geographic data.

Parcelization of spatially organized data is illustrated with reference to FIG. 10. FIG. 10 shows the map 210 of the geographic region 212, previously illustrated in FIG. 3. The plurality of positions 214 (represented by the dots or points) are shown to be located on the map 210. Each of the positions 214 represents a place or point in the geographic area 212 at which there is located a feature about which information is included in the geographic database 162 of FIG. 2. For example, the positions 214 may correspond to the physical locations of end points of road segments, points along road segments, points-of-interest (such as hotels, civic centers, etc.), and so on, which are represented by the data in the geographic database 162. Each of these locations 214 has a unique physical location (latitude, longitude, and optionally absolute or relative altitude) and each of the locations 214 can be uniquely identified by its two dimensional (or three dimensional) geographic coordinates (i.e., latitude, longitude, and optionally altitude).

In FIG. 10, a grid 317 overlays the geographic region 212 represented by the map 210. The grid 317 divides the geographic region 212 into a plurality of rectangular areas 319. The grid lines of the grid 317 represent the boundaries of rectangular areas 319. These rectangular areas 319 may be all the same size or may have different sizes depending upon the procedure used for parcelization. Likewise, the locations of the boundaries may depend on the parcelization procedure used. In general, when using any of the procedures for spatial parcelization, the data records of a particular type of data which represent features that are encompassed within each rectangular area 319 are grouped together in a separate parcel of data. Referring again to FIG. 9, the plurality of data records, such as road segment records and node records that comprise the routing subset 236 of the geographic database 162, are separated into groupings (i.e., parcels 320). With respect to the spatially organized data, each parcel 320 of routing data in FIG. 9 includes data records which represent the geographic features encompassed within a separate one of the plurality of rectangles 319 shown in FIG. 10.

As shown in FIG. 9, the parcels 320 are then stored to form the database 162 so that the data in each parcel 320 are logically and/or physically grouped together. Since the parcel represents a quantity of data records that are accessed at the same time by the navigation system, when a parcel of data is accessed, all of its data records are read into the memory of the navigation system at the same time. With reference to the map 210 of FIG. 10, this means that all the data records, such as the segment records or node records, of a spatially organized type of data that represent geographic features encompassed within each rectangle 319 are accessed together as a group. It can be appreciated that for certain kinds of navigation functions, it is desirable to have in memory at the same time all the data records that represent features that are physically close together in the geographic region.

As the parcels 320 are formed for these types of data, the parcels are ordered. Various types of ordering may be used. In general, it is preferred that the parcels be ordered in a manner that minimizes searches for data. One way to order spatially organized parcels is to use a depth-first ordering from a kd-tree index within each type of data. This provides an ordering similar to Peano-key ordering. Parcels may be stored on disk (i.e., medium 164 in FIG. 2) in this approximate Peano-key order. One or more indices, such as a kd-tree, can be used to access parcels spatially. This index is useful for initial location of an arbitrary position, such as when a program in a navigation system initially locates the map data corresponding to a current vehicle position.

As the parcels 320 are ordered, each may also be assigned a unique parcel identifier (e.g., a "parcel ID"). The parcel ID is a identification (e.g., a number) by which the parcel can be identified and it can be used to refer to the parcel when necessary to retrieve the parcel or any of the data contained therein. In one embodiment, the parcel ID's are assigned to the parcels in the same order in which the parcels are formed and in the same order in which the parcels are ordered in the database. This has the advantage that, knowing the sizes of the parcels, the parcel ID can be used as an offset from the beginning of the database file to locate the position of any parcel on the media.

(2). Parcelization of non-spatially organized data.

Some kinds of data are not spatially organized. Parcelization may provide advantages for these kinds of data as well. Each parcel of non-spatially organized data does not necessarily correspond to any of the rectangular areas 319 in FIG. 10. For example, the navigation feature name data 246 that represent the names of geographic features, such as streets and intersections, may be organized alphabetically instead of spatially. Also, place data 250 are among the kinds of data that are not spatially organized. Place data 250 are organized by administrative hierarchy. Place data 250 include place data records which are used to represent governmental or administrative areas, (e.g., countries, cities, states, counties, zones, settlements, and so on). Place data 250 are organized in a hierarchical manner that takes into account the administrative levels of the places represented by the data. Once the place data records are organized in this hierarchical manner, they are formed into parcels 320 (in FIG. 9) and stored to form the geographic database. Since the place data entities are not spatially organized, each parcel of place data does not necessarily correspond to any of the rectangular areas 319 in FIG. 10.

According to one embodiment, place data are arranged by levels which correspond to the administrative hierarchy. Level 1 place data records (i.e., those corresponding to the "countries" whose geographic features are represented by the geographic database 162) are included first in the place data 250. If more than one country is represented by the geographic database (e.g., Canada and the United States), the level 1 records are ordered alphabetically.

Next, all the level 2 place data records (i.e., those corresponding to the "states" in the U.S. or "provinces" in Canada) whose geographic features are represented by the geographic database 250 are arranged. These place records are ordered first according to which of the countries represented by level 1 records they are a part of, and then once they are sorted by country, they are sorted alphabetically. Thus, if the geographic database includes Canada and the United States, all the place data records that represent provinces of Canada are arranged in alphabetical order first followed by all the place data records that represent states of the United States arranged in alphabetical order. (Note that the geographic database does not necessarily include all the states or all the provinces. Only those that are represented by the geographic database are included.)

Next, all the level 3 place data records (i.e., those corresponding to the "counties" in the U.S. and Canada) whose geographic features are represented by the geographic database 162 are arranged. These place records are ordered first according to which of the states (or provinces) represented by level 2 records they are a part of, and then alphabetically. Thus, if the geographic database includes Illinois and Iowa, all the place data records that represent counties of Illinois are arranged in alphabetical order first, followed by all the place data records that represent counties of Iowa arranged in alphabetical order.

Finally all the level 4 place data records (i.e., those corresponding to the "cities" in the U.S. or Canada) whose geographic features are represented by the geographic database 162 are arranged. These place records are ordered first according to which of the states (or provinces) represented by level 2 records they are a part of, and then alphabetically. Thus, if the geographic database includes Illinois and Iowa, all the place data records that represent cities of Illinois are arranged in alphabetical order first, then followed by all the place data records that represent cities of Iowa arranged in alphabetical order.

The parcelization of place data described above represents one way that these data records can be organized. Other kinds of organization may be used. For example, other kinds of hierarchical arrangements may be used for the place data. Alternatively, the place data records may be spatially organized like the routing data.

Within the subset of navigation feature name data 246, the navigation feature records 262 are organized by navigation feature ID (i.e., 262(1)). The navigation feature name ID's are assigned alphabetically by the represented name. Like the other kinds of data, the navigation feature name records are organized into a plurality of parcels (such as the parcels 320 shown in FIG. 9) each of which contains a plurality of navigation feature name data records 262. Thus, the plurality of navigation feature data records 262 that comprise the entire navigation feature name data subset 246 (in FIG. 5) may be contained in a plurality of parcels 320.

F. Using features of the geographic database.

Some or all of the features described above can be implemented in a geographic database to enable improved performance by a navigation-related applications that use the geographic database. These features provide for improved performance by arranging and/or organizing the portions of the geographic data in ways to facilitate access to or use of the data in the geographic database for performing certain navigation functions. In order for a navigation-related applications to benefit from some or all of the performance enhancing features provided by the geographic database, the application functions that use or access the geographic database may be required to be written to exploit the features.

For example, the route calculation function 142 (in FIG. 2) may calculate a solution route by examining potential routes from each intersection between a starting point and a destination location. The route calculation application 142 may be able to determine a solution route more quickly if it can limit the examination of potential routes to those road segments that have, in general, the fastest speed limits and/or greatest capacities. To provide for this kind of limited examination, the geographic database can be organized into layers, as mentioned above in connection with FIG. 8. When the routing data are organized into layers, higher ranked (and generally faster) roads are organized into physically separate collections (or layers). However, the higher layers, though generally faster, are also generally less detailed and may not be appropriate for use throughout the entire route calculation process, such as at the starting or ending portions of a route.

In order to take advantage of this layering arrangement feature of the routing data 236 in the geographic database 162, the route calculation function 142 can include an appropriate command or routine that determines which layers of the routing data 236 should be used at various stages of the route calculation process. The route calculation function 142 may use suitable logic or algorithms to determine which layers should be used at which stage of the route calculation process based upon various factors. Then, depending upon the determination of the appropriate layer, the route calculation function 142 (or another subprogram) makes an appropriate function call or command to indicate from which layer the routing data should be retrieved. Therefore, in order for the logic or algorithms in the route calculation application to take advantage of the layering in the routing data 236, it may be necessary to take into account the number of different layers in the routing data and the level of detail in each layer.

Other functions in the navigation-related applications 119 also may be required to be designed with the features of the geographic database taken into account. For example, in order to display a particular section of the geographic area on a display screen, functions in the navigation applications may be required to be able to translate the geographic coordinates of the area desired to be displayed into an identification of the parcels that contain the cartographic data needed to represent the area. The identification of the parcels on the medium that contain the cartographic data may be provided by the library of interface layer functions 154 (in FIG. 2) that facilitate the translation of spatial coordinates into an identification of parcels using indices prepared as part of the geographic database.

III. The Route Preview Function

A. Overview of the navigation programming.

As mentioned above in connection with FIG. 2, included in the software portion of the navigation system 110 are the applications 119 that provide for the navigation-related functions and/or features performed by the navigation system 110. These navigation-related programs and applications 119 use the geographic data 140 in conjunction with input from the user interface 131, and possibly in conjunction with outputs from the positioning system 124, to provide the various navigation-related features and/or functions.

In one present embodiment, the navigation-related programs and applications 119 may be provided as modules that are relatively portable and that can be incorporated into different kinds of systems and/or platforms. The navigation-related applications 119 may be compiled together to form a single executable program which is stored on the non-volatile medium 116 (in FIG. 1). Alternatively, each of navigation-related applications 119 may be provided as one or more standalone programs.

In one embodiment, the navigation-related applications 119 employ an object-oriented approach to their programming and use of data. According to this embodiment, each of the navigation-related applications is formed of one or more objects, each of which receives input data and generates output data according to a predefined function and each of which may invoke methods on other objects. In one present embodiment, each object has its own private memory that is opaque to other objects. In one embodiment, an object may be used to convey data from one object to another object or may be used to transform data received as input. In one embodiment, the navigation-related applications 119 are written in the C programming language although in alternative embodiments other programming languages may be used, such as C++, Java, Visual Basic, and so on.

B. The route calculation application.

As stated above in connection with FIG. 2, the route calculation functions of the navigation system 110 are performed by the route calculation application 142. Referring to the embodiment shown in FIG. 11, the manager application 155 provides a request to the navigation application 142 to calculate a route. The request by the manager application 155 specifies at least an origin and a destination. The request by the manager application 155 to the route calculation application 142 may include additional information, such as desired intermediate stops, driver preferences, a start time, etc.

In one embodiment, the request to calculate a route may originate with the end user. The end user may indicate a desired destination using the user interface 131. Unless the end user also identifies an origin using the user interface 131, the current vehicle position may be taken as the origin.

In one embodiment, the origin and destination are specified to the route calculation function 142 relative to data in the geographic database. For example, the origin and destination may be specified at or along a road segment represented by an identified road segment data record. The manager application 155 may obtain from the vehicle positioning application 148 an identification of the road segment data record that represents the road segment upon which the vehicle is currently located. The manager application 155 may obtain from the geo-coding application 141 an identification of the road segment data record that represents the road segment upon which the desired destination indicated by the end user is located. (If the end user also specifies a desired origin, the manager application 155 may obtain an identification of the road segment data record that represents the road segment upon which the desired origin is located from the geo-coding application 141.) Thus, according to this embodiment, when the manager application 155 requests the route calculation application 142 to calculate a route between a specified origin and destination, it first obtains data from the geo-coding application 141 and possibly the vehicle positioning application 148 that relates the origin and destination to data in the geographic database 162. In an alternative embodiment, the functions of relating the end-user specified destination and origin or the vehicle position may be performed by other routines including routines in the route calculation application 142.

As stated above, the route calculation application 142 may receive additional data that affects the calculation of the route. For example, the route calculation application 142 may receive data that specifies end-user preferences, such as avoidance of toll roads or expressways, and so on. The route calculation application 142 may also receive data that identifies the time of day at which the route will be started which may affect the calculation of a route. The route calculation function 142 may also receive data indicating intermediate stops that the end user would like to make.

Given data that identify the positions of an origin and destination, the route calculation application 142 calculates a route between the origin and the destination. The route calculation application 142 may use any of various means or algorithms for this purpose. For example, the method used may include either the A* algorithm or the Dykstra algorithm. Methods for calculating routes are disclosed in Ser. No. 08/893,201, filed Mar. 25, 1998, the entire disclosure of which is incorporated by reference herein. (The methods disclosed in the aforementioned patent application represent only some of the ways that routes can be calculated and the subject matter claimed herein is not limited to any particular method of route calculation. Any suitable route calculation method now known or developed in the future may be employed.)

Regardless of the method used, the objective of the route calculation application 142 is to develop a list identifying a continuous series of road segments that form a legally valid solution route between the origin and destination. (A "legally valid solution route" conforms to known traffic restrictions, such as one way streets, turn restrictions, etc.) The method used by the route calculation application 142 may be designed to optimize the solution route to meet one or more predetermined criteria. Such criteria may include the least travel time, the shortest distance, the fewest turns, etc. If the method used by the route calculation application 142 is designed to find a solution route that is optimized for one or more criteria, then the solution route also ideally meets these one or more criteria.

When using any of the aforementioned methods for calculating a solution route, the route calculation application 142 may explore several different alternative potential paths leading from the origin for inclusion in the solution route. The route calculation application 142 may also explore several different alternative potential paths leading back from the destination for inclusion in the solution route. Also, the route calculation application 142 may explore several different alternative potential paths leading from all or some of the intersections along potential portions of a solution route. For example, additional alternative paths may be identified and explored whenever an intersection having more than one valid successor road segment is encountered along an existing alternative potential solution path being explored. The number of different alternative potential solution paths can increase rapidly. According to some route calculation methods, as route calculation proceeds some alternative potential solution paths being explored may be discarded based upon comparisons to other more promising alternative potential solution paths. According to some route calculation methods, as route calculation proceeds, further exploration of some alternative paths being explored may be suspended or deferred in favor of other, more promising, alternative potential solution paths.

As the route calculation application 142 evaluates different alternative potential solution paths for inclusion in the solution route, it stores data identifying the road segments included in each alternative potential solution path. The route calculation application 142 stores some of all of the data from the road segment data entities 258 that represent road segments identified as being included in a potential solution path. According to one present embodiment, database ID's (e.g., segment ID's 258(1) in FIG. 6) that identify the road segment data records that represent the road segments included in each different alternative path are stored. In a present embodiment, for each of the road segment data entities 258 that represents a road segment identified as being included in a potential solution path, the route calculation application 142 stores the name on road sign data 258(6), the classification 258(4), whether the segment is associated with special explication 258(9), whether the segment is part of a roundabout 258(10), and whether the segment is part of a ferry 258(11). The route calculation application 142 may also store additional data relating to each of the alternative potential solution paths, such as the total distance of all the road segments included in each alternative potential solution path, the total time of travel for each alternative potential solution path, and so on.

Figure 11:
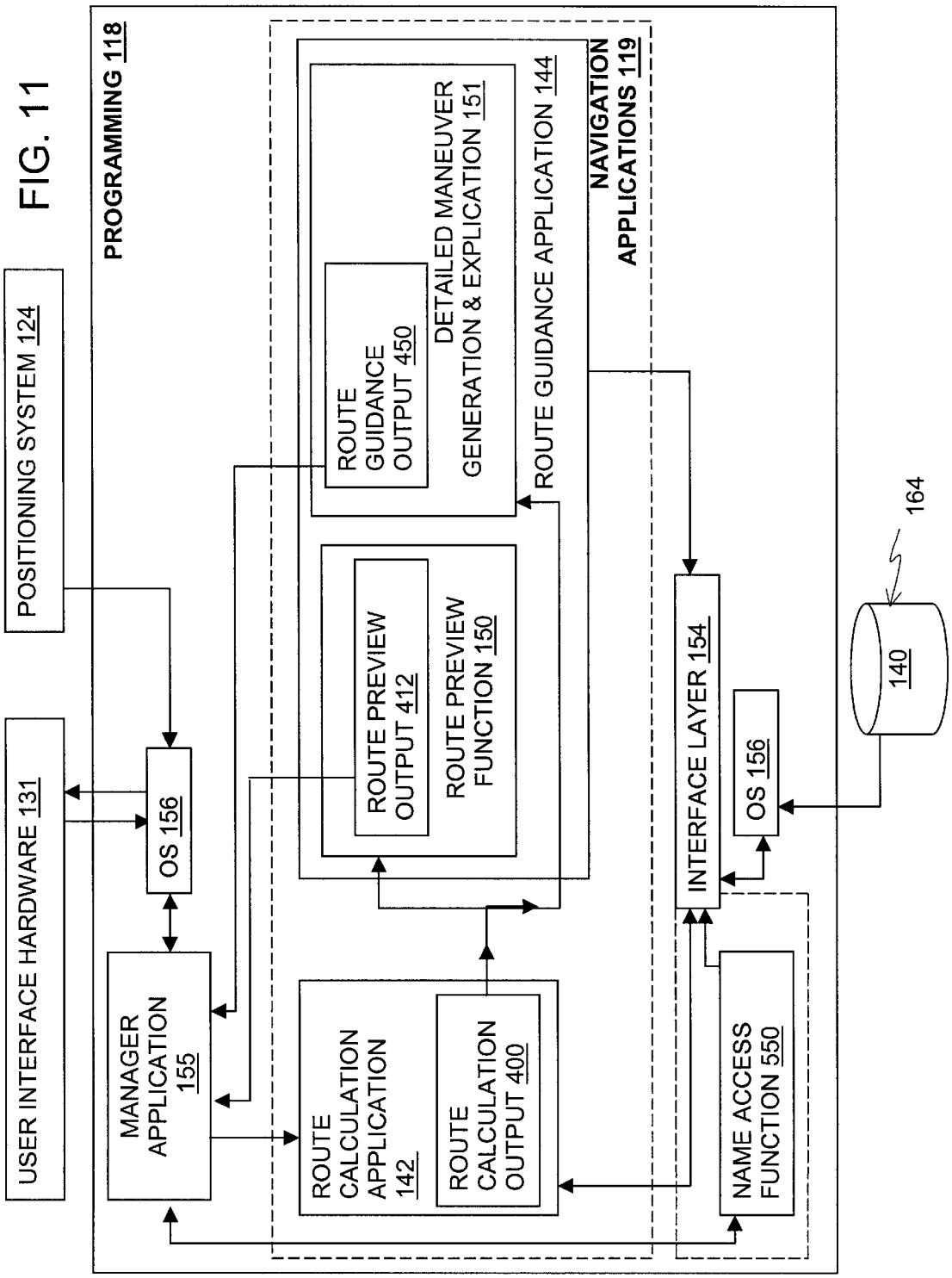
FIG. 11 is a block diagram showing relationships between the route calculation application, the route guidance application and the route preview function shown in FIG. 2.
Figure 12:
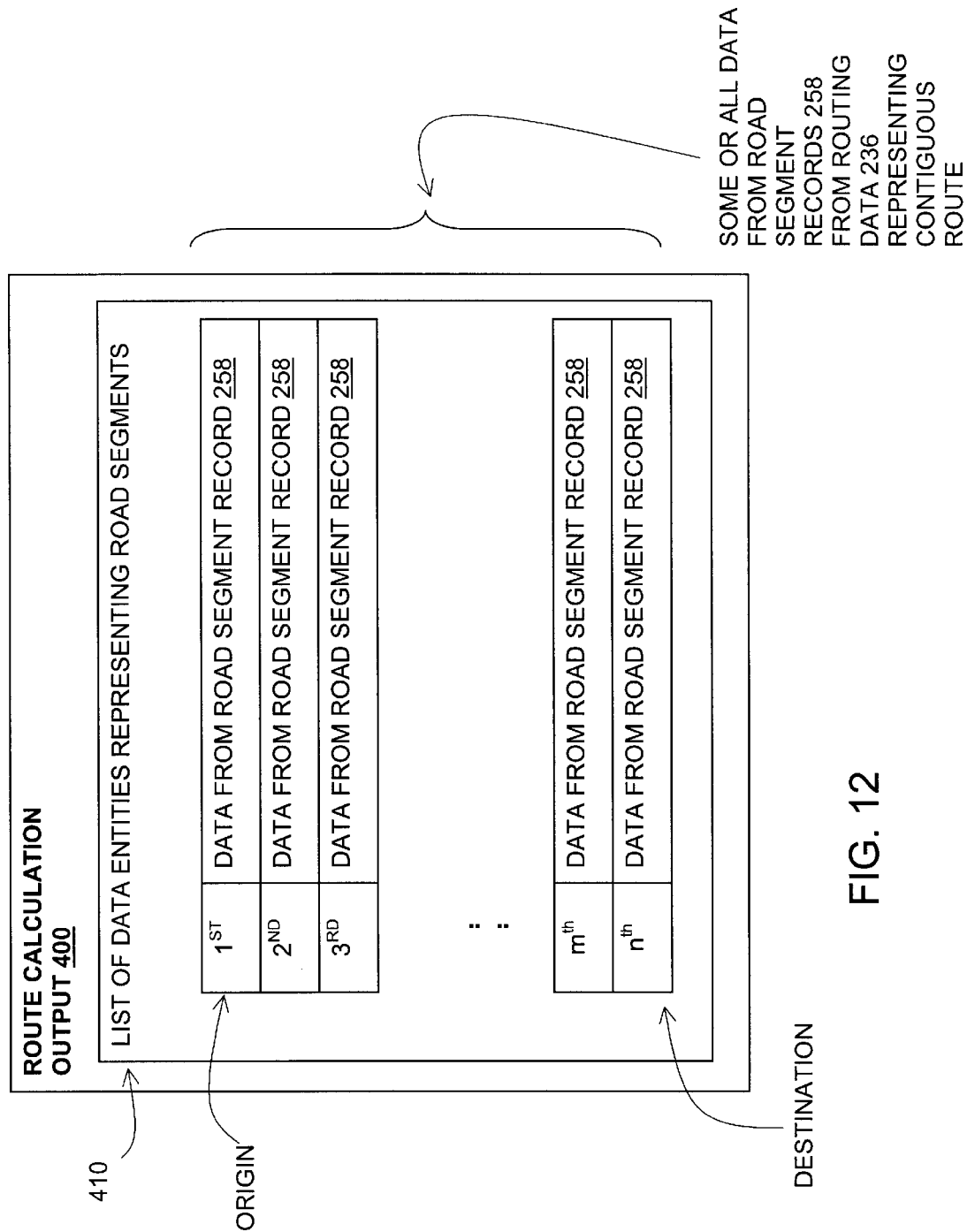
FIG. 12 is a block diagram showing components of the output of the route calculation application shown in FIG. 11.

Referring to FIG. 11, after the route calculation application 142 has found a solution route, an output 400 is provided to the route guidance application 144. FIG. 12 is a diagram representing the components of the output 400 of the route calculation application 142. The route calculation output 400 contains an ordered list 410. Each entry in the ordered list identifies a road segment data entity 258 that represents a road segment that forms part of the solution route between the origin and the destination. The plurality of data entities 258 represent the road segments that form the continuous navigable route between the origin and the destination that has been calculated by the route calculation application 142.

Each entry in the list 410 includes some or all of the information from the road segment data entity 258. For example, each entry in the list 410 includes the ID 258(1) and the name on road sign information 258(6) from the record 258 associated with the represented road segment. As mentioned above, if a road segment is referred to by name by one or more road signs, the data record 258 that represents this road segment in the routing data 236 includes a reference 258(6) to each of the corresponding records 262 in the navigable feature name data 266 that include these names on road signs. Each entry on the list 410 also includes other data from the record 258 that represents the road segment, such as the classification 258(4), the data 258(9) indicating whether the segment is associated with a special explication, the data 258(10) indicating whether the segment is part of a roundabout, the data 258(11) indicating whether the segment is part of a ferry, the data 258(12) indicating whether the segment is part of a special traffic figure, the data 258(13) indicating whether the segment is part of a highway interchange, the data 258(14) indicating the administrative area (e.g., city, state, etc.) in which the represented road segment is located, and the data 258(15) indicating whether the segment has a vehicle restriction (e.g., no trucks, no taxis, and so on).

Each entry in the list 410 may include additional information. The route calculation output 400 may include other information 430 in addition to the ordered list of entries that include data from road segment data entities.

In a present embodiment, the output 400 created by the route calculation application 142 is used as an input to the route guidance application 144. The route guidance application 144 includes functions 151 that provide detailed maneuver instructions and explication as the vehicle is being driven along the route calculated by the route calculation application 142. These functions 151 use the data from the entries in the list 410 included in the output 400 from the route calculation application 142, as well as additional information obtained from the geographic database 162, to develop detailed maneuvering instructions. Methods for developing these detailed maneuvering instructions are described in copending applications Ser. Nos. 08/893,201 and 09/196,279, the entire disclosures of which are incorporated by reference herein.

The detailed maneuver instructions developed by the functions 151 of the route guidance application 144 are provided as a data output 450 of the route guidance application 144. This data output 450 is returned to the manager application 155. The data output 450 may be passed directly to the user interface 131 for presentation to the end user. Alternatively, the data output 450 returned by the route guidance application 144 to the manager application 155 may be further processed by programming in the manager application 155. The presentation of route guidance information to the end user via the user interface 131 may be in the form of audible instructions, visual textual instructions, visual graphical instructions, or any combinations of these or other types of information presentation.

C. The route preview function.

Referring to FIGS. 11–15, according to a present embodiment, the list 410 of entries that includes data from the road segment data entities that represent road segments included in the output 400 created by the route calculation application 142 is also used as an input to the route preview function 150 which is part of the route guidance application 144.

According to one embodiment, the route preview function 150 is an optional feature. The route preview function 150 forms part of the navigation application programming 119 and, in particular, part of the route guidance application 144. However, the route preview function 150 can be set so that it either runs automatically, runs only when selected, or does not run at all. The default operation of the route preview function may be configured by the end user or alternatively the default operation of the route preview function may be configured by the manufacturer of the navigation system. For example, the navigation system manufacturer may sell systems that have different hardware resources, e.g., memory, etc., but that have the same software. The manufacturer may set the fast preview function to run only on systems with sufficient resources.

The route preview function 150 receives the output 400 of the route calculation application 142 at the same time as or before the functions 151 that provide detailed maneuver instructions and explication that are also part of the route guidance application 144. The route preview application 150 uses the data in the list 410 to develop a list 412 of route preview data structures. Each route preview data structure is a variable length data structure. (The components of a route preview data structure 413 are described below in connection with FIG. 15.) The list 412 of route preview data structures 413 is provided as an output 414 of the route preview function 150. The output 414 is returned to the manager application 155 for providing a preview of the calculated route. Unlike the functions 151 in the route guidance application 144 that provide detailed maneuvering instructions, the route preview function 150 does not access the geographic database 162 before returning an output to the manager application 155.

Figure 13:
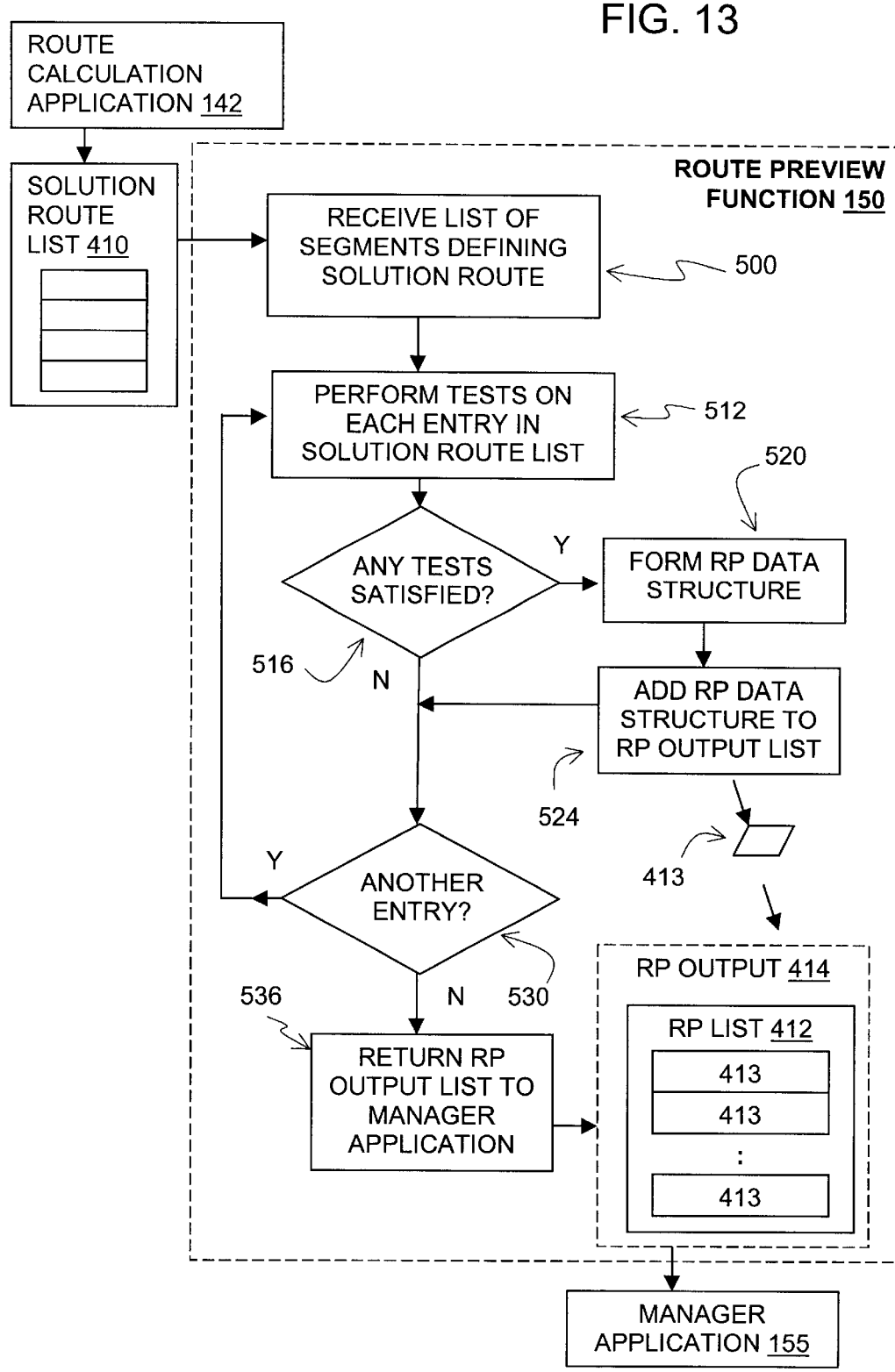
FIG. 13 is a flow chart showing steps performed by the route preview function shown in FIG. 11.

FIG. 13 illustrates steps that are performed by the route preview function 150 in order to develop the output 414 which includes the list 412 of route preview data structures 413 which is returned to the manager application 155. In FIG. 13, the route preview function 150 receives the list 410 from the route calculation function 142 (Step 500). The entries in the list 410 contain data from the road segment data entities 258 that represent the road segments in the solution route. The route preview function 150 examines the entries in the list 410 from the route calculation application 142. The entries in the output list 410 of the route calculation function 142 are examined starting with the first entry in the list 410 and proceeding to the next entry, and so on, until the last entry in the list is examined.

Figure 14:
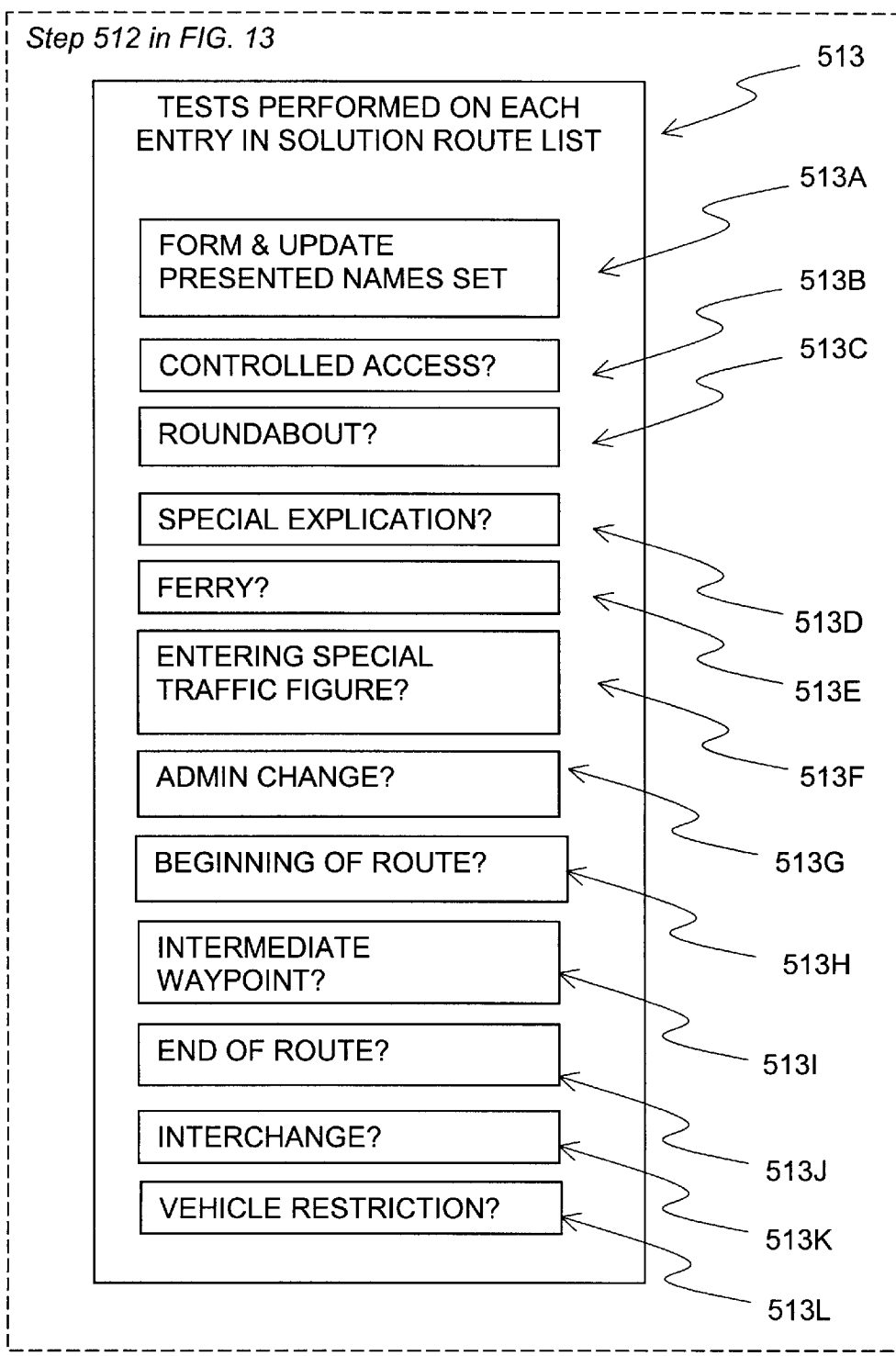
FIG. 14 is a block diagram showing tests performed by the route preview function shown in FIG. 13.

Each entry in the route output list 410 is examined by performing a series of tests on the data in the entry (Step 512). FIG. 14 shows the tests 513 performed by the route preview function 150 according to this embodiment. If any one of the tests in FIG. 14 is satisfied for an entry in the route output list 410, the route preview function 150 forms a route preview data structure 413 for the entry. If none of the tests 513 is satisfied for an entry in the route output list 410, the route preview function 150 does not form a route preview structure for the entry.

A first test 513A relates to whether the name of the road in the solution route changes. To help make this determination, the route preview function 150 forms a presented names set. When the first entry in the solution route is examined by the route preview function 150, all the name ID's from the name on road sign references 258(6) associated with the first entry are included in the presented names set. Thereafter, as each subsequent entry in the solution route list 410 is examined, all the name ID's from the name on road sign references 258(6) associated with the new entry are compared to the name ID's in the existing presented names set. If all the name ID's in the presented names set are already included in the new entry, this test is not satisfied and no route preview data structure is indicated for the new entry based upon a change in the name of the solution. If all the name ID's in the presented names set are not already included in the new entry, this test is satisfied and a route preview data structure is indicated for the new entry based upon a change in the name of the solution. Then, the name ID's in the presented names set are replaced with the name ID's of the new entry.

Also included among the tests 513 is a test 513B for entering or exiting from a controlled access road. If the entry in the list 410 being examined includes data 258(4) indicating the road segment associated with the entry is a controlled access road and the data from the previous entry indicated that the road segment associated with the previous entry was not a controlled access road, the test 513B is satisfied and a route preview data structure is indicated for the new entry based upon entering a controlled access road. Likewise, if the entry in the list 410 being examined includes data 258(4) indicating the road segment associated with the entry is not a controlled access road and the data from the previous entry indicated that the road segment associated with the entry was a controlled access road, the test 513B is satisfied and a route preview data structure is indicated for the new entry based upon exiting from a controlled access road. However, if the road classification data 258(4) in an entry being examined is the same as the road classification data 258(4) in the previous entry, the test 513B is not satisfied and a route preview data structure is not indicated for the new entry based upon entering or exiting a controlled access road.

Another of the series of tests is a test 513C for entering or exiting a roundabout. If the entry in the list 410 being examined includes data 258(10) indicating the road segment associated with the entry is part of a roundabout and the data 258(10) from the previous entry indicates that the road segment associated with the previous entry is not part of a roundabout, the test 513C is satisfied and a route preview data structure is indicated for the new entry based upon entering a roundabout. Similarly, if the entry in the list 410 being examined includes data 258(10) indicating the road segment associated with the entry is not part of a roundabout and the data 258(10) from the previous entry indicates that the road segment associated with the previous entry is part of a roundabout, the test 513C is satisfied and a route preview data structure is indicated for the new entry based upon leaving a roundabout. However, if the roundabout data 258(10) in an entry being examined is the same as the roundabout data 258(10) in the previous entry, the test 513C is not satisfied and a route preview data structure is not indicated for the new entry based upon entering or exiting a roundabout.

Another of the series of tests is a test 513D for a special explication segment. A segment may be marked as a special explication segment if an aspect of the represented segment suggests a need for special instructions. This may occur if travel in a particular lane is required. If the entry in the list 410 being examined includes data 258(9) indicating the road segment is associated with a special explication, the test 513D is satisfied and a route preview data structure is indicated for the new entry based upon the presence of a special explication. However, if the data 258(9) in an entry being examined does not indicate a special explication, the test 513D is not satisfied and a route preview data structure is not indicated for the new entry based upon the presence of a special explication.

A similar test 513E may be included to evaluate whether the segment in the entry from the list 410 is part of a ferry.

Another test 513F may be used to evaluate whether the segment is part of a special traffic figure.

Another test 513G is used to determine when the solution route crosses the boundaries of a city or state. If the entry in the list 410 being examined includes administrative area data 258(14) indicating the road segment associated with the entry is located in one administrative area (e.g., city, state, etc.) and the administrative area data 258(14) from the previous entry indicates that the road segment associated with the previous entry is located in a different administrative area, the test 513G is satisfied and a route preview data structure is indicated for the new entry based upon crossing the boundary of an administrative area. However, if the administrative area data 258(14) in an entry being examined is the same as the administrative data 258(14) in the previous entry, the test 513G is not satisfied and a route preview data structure is not indicated for the new entry based upon crossing the boundary of an administrative area.

Another of the series of tests is a test 513H for the beginning of a route. If the entry being examined is the first entry in the list 410, the test 513H is satisfied and a route preview data structure is indicated for the beginning of a route. If the entry being examined is any entry other than the first entry in the list 410, the test 513H is not satisfied.

Another of the series of tests is a test 513I for an intermediate waypoint of a route. An intermediate waypoint is a location along the solution route between the origin and the destination through which the solution route is constrained to pass. An intermediate waypoint may be an intermediate stop along the solution route. A solution route may have one or more intermediate waypoints or may have no intermediate waypoints. If the entry being examined in the list 410 leads to an intermediate waypoint, the test 513I is satisfied and a route preview data structure is indicated for an intermediate waypoint of a route. If the entry being examined is any entry other than an entry to an intermediate waypoint in the list 410, the test 513I is not satisfied.

Another of the series of tests is a test 513J for the end of a route. If the entry being examined is the last entry in the list 410, the test 513J is satisfied and a route preview data structure is indicated for the end of a route. If the entry being examined is any entry other than the last entry in the list 410, the test 513J is not satisfied.

Another test is a test 513K for entering a highway interchange. If the entry in the list 410 being examined includes data 258(13) indicating the road segment associated with the entry is part of a highway interchange and the data 258(13) from the previous entry indicates that the road segment associated with the previous entry is not part of a highway interchange, the test 513K is satisfied and a route preview data structure is indicated for the new entry based upon entering a highway interchange. However, if the highway interchange data 258(13) in an entry being examined is the same as the highway interchange data 258(13) in the previous entry, the test 513K is not satisfied and a route preview data structure is not indicated for the new entry based upon entering a highway interchange.

Another test is a test 513L for entering a vehicle restricted road segment. If the entry in the list 410 being examined includes data 258(15) indicating the road segment associated with the entry has a vehicle restriction (e.g., trucks or taxis prohibited), the test 513L is satisfied and a route preview data structure is indicated for the new entry based upon entering a vehicle restricted road. However, if the vehicle restricted data 258(13) does not indicate a vehicle restriction, the test 513L is not satisfied and a route preview data structure is not indicated for the new entry based upon entering a vehicle restricted road.

Referring again to FIG. 13, if any of the tests performed for an entry is satisfied, a route preview data structure 413 is formed for the entry (Steps 516 and 520). When a route preview data structure is formed, it is added to a list that contains any route preview data structures already formed (Step 524).

Figure 15:
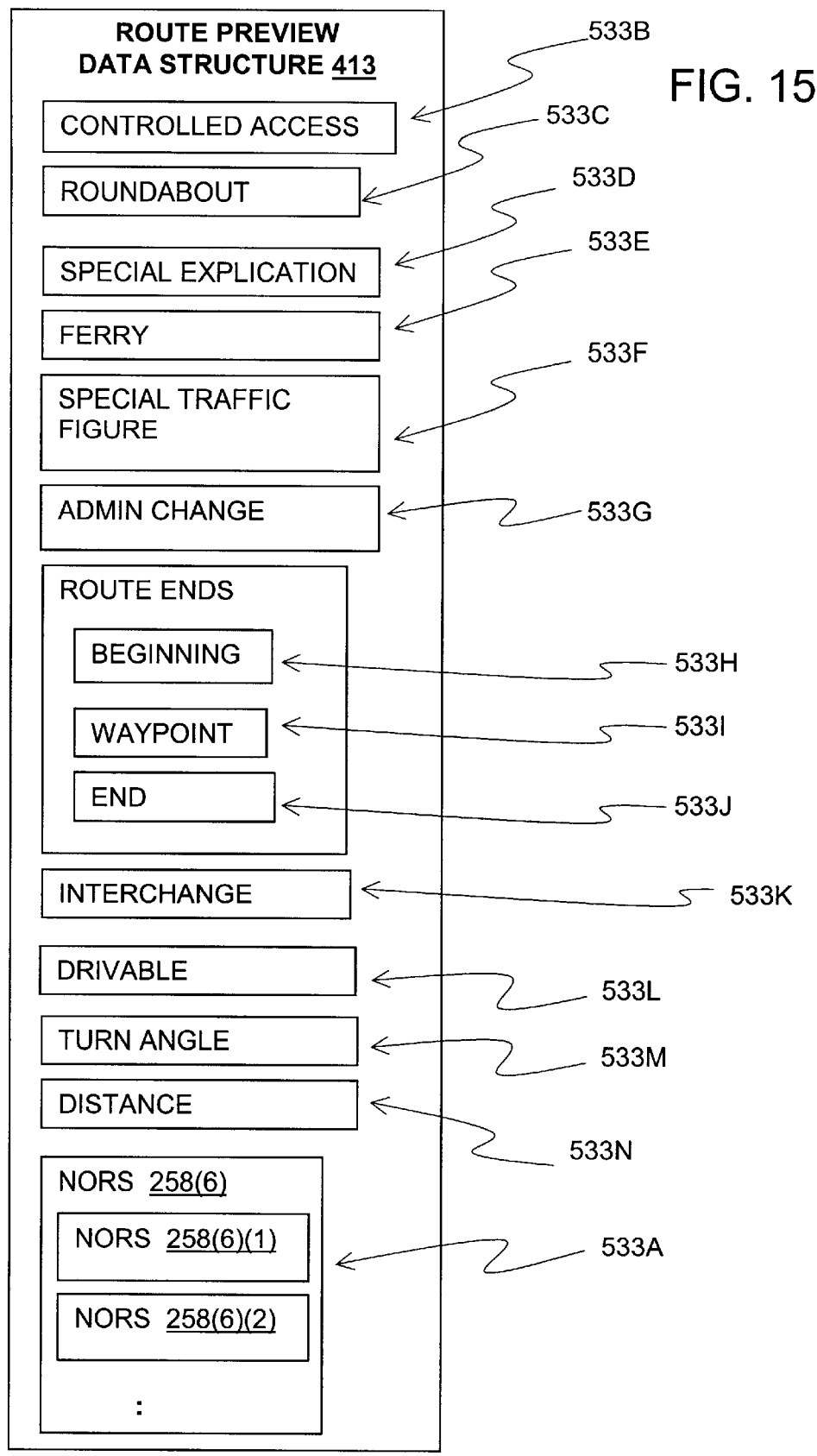
FIG. 15 is a block diagram showing components of the route preview data structure shown in FIG. 13.

The components of a route preview data structure 413 are shown in FIG. 15. The route preview data structure 413 includes particular items of data based upon which of the tests 513 (in FIG. 14) were satisfied. Because the formation of a route preview data structure 413 depends on satisfying one or more of the tests 513 (in FIG. 14), a route preview data structure 413 does not necessarily include all the components shown in FIG. 15. The route preview data structure 413 may include only one of the components, or the route preview data structure 413 may include more than one of the components if more than one of the tests 513 is satisfied for an entry from the solution route.

In FIG. 15, the route preview data structure 413 may include one or more of the following: an indication 533B that a segment along the route is an entrance to or exit from a controlled access road, an indication 533C that the segment along the solution route is part of a roundabout, an indication 533D that the segment along the route is associated with a special explication, an indication 533E that the segment along the route is part of a ferry, an indication 533F that the segment along the route is part of a special traffic figure, an indication 533G that the segment along the route is at the boundary of an administrative area, an indication 533H that the segment is at the beginning of the route, an indication 533I that the segment is at an intermediate waypoint along the route, an indication 533J that the segment is at the end of the route, an indication 533K that the segment is part of a highway interchange, and an indication 533L whether the segment is drivable by various classes of vehicles (e.g., taxis, trucks, and so on).

(In one embodiment, each of the components 533B–533L, listed above, may be provided by a single bit.)

The route preview data structure 413 may also include additional information. In one embodiment, the route preview data structure 413 may include a turn angle 533M from the previous segment, if appropriate, and the distance 533N to the next entry in the route preview output list 412.

The route preview data structure 413 may include a list 533A that includes one or more name ID's (i.e., 258(6)). If an entry from the solution route 410 satisfies the name change test 513A, described above, all the name ID's 258(6) associated with the segment associated with the entry in the solution route 410 are included in the corresponding route preview data structure 413 which is formed as a result of satisfying the name change test 513A.

Referring again to FIG. 13, after the all the tests 513 are performed on an entry in the route calculation output list 410, the route preview function 150 examines the next entry in the route calculation output list 410 (Step 530) until all the entries have been examined. The route preview structures 413 formed while performing the tests on the entries in the output list 410 from the route calculation application 142 are stored in the order in which they were formed in the list 412 that forms the route preview output 414. Thus, the list 412 that forms the route preview output 414 contains the plurality of variable sized data structures 413 which were formed by examination of one or more entries from the output list 410 of the route calculation function 142. This list 412 of route preview data structures 413 is provided to the manager application 155 (Step 536).

D. The name access function.

Figure 16:
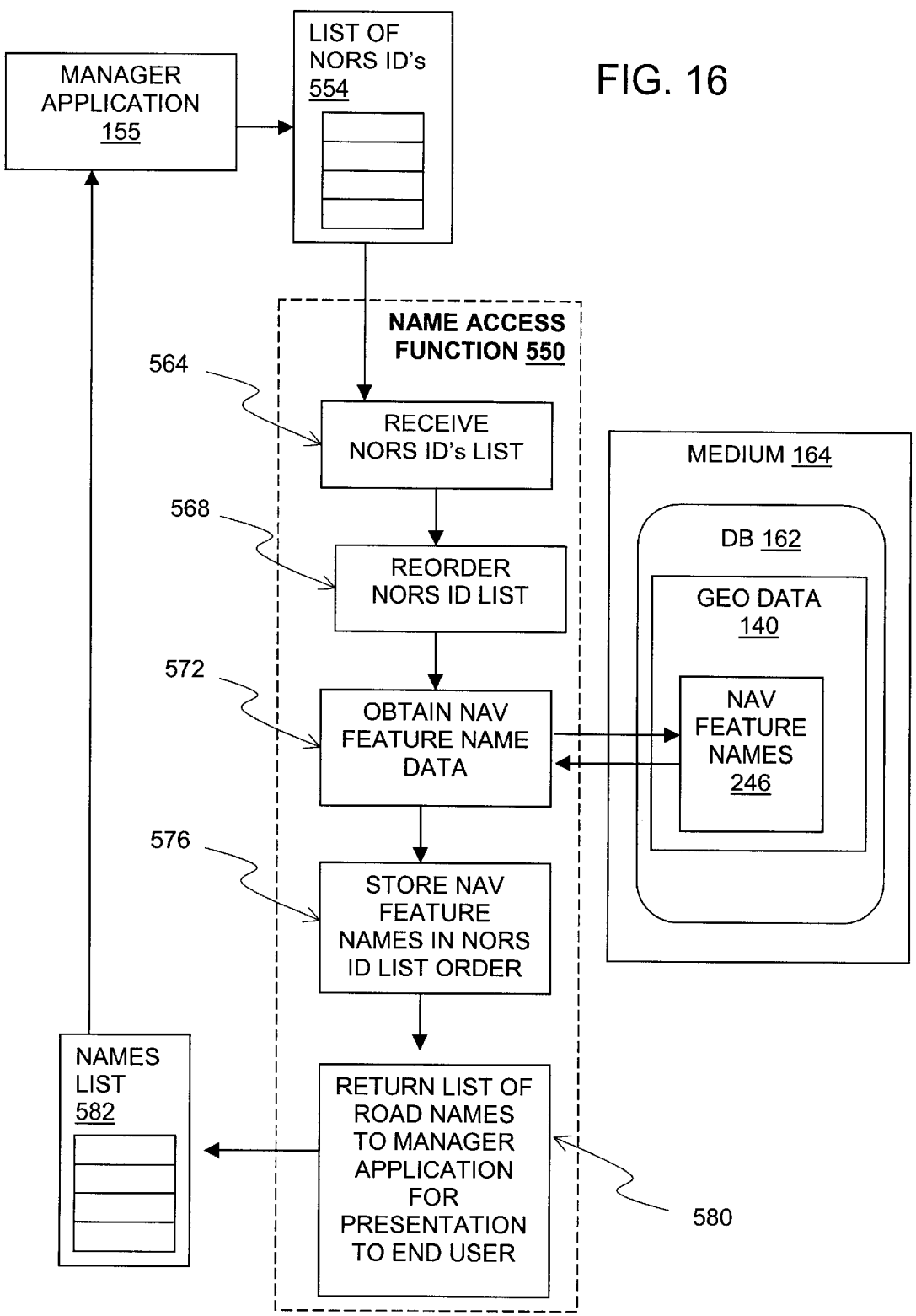
FIG. 16 is a flow chart showing steps performed by the name access function called by the manager application shown in FIG. 11.

Referring to FIGS. 11 and 16, after the manager application 155 receives the list 412 from the route preview function 150, a preview of the route can be provided to the end user. If the manager application 155 is configured to include the names of roads as part of the route preview feature, it obtains the names by calling a function 550 (referred to herein as the "name access" function 550) that can access the actual text of the road names from the navigation feature name data 246 given the name ID. In one embodiment, the name access function 550 is part of the interface layer 154 (shown in FIG. 2). In a present embodiment, the name access function 550 can accept a list containing multiple name ID's. The function 550 then reorders the name ID's in the list received from the manager application 155 so that the name records 262 identified by the name ID's can be accessed efficiently. Operation of the function 550 is described in connection with FIG. 16.

Referring to FIG. 16, the manager application 155 extracts the name ID's in from the list 412 provided to it by the route preview function 150 and provides the name ID's in a list 554 to the name access function 550. The name access function 550 receives the list 554 of name ID's from the manager application 155 (Step 564). The name ID's in the list 554 are in the same order in which they occur in the list 412 received by the manager application 155 from the route preview function 150. The name access function 550 reorders these name ID's in order to minimize the amount of time needed to access the navigable feature name data records 262 referenced by the ID's in the list 554 (Step 568). For example, the name access function 550 may reorder the ID's in the list 554 so that all the navigable feature name data records are accessed in the order in which they occur in the navigable feature data 246. In one embodiment, navigable feature data records are stored in order by navigable feature data record ID (262(1) in FIG. 7). In one embodiment, the navigable feature ID's 262(1) are assigned to the navigable feature name data records 262 in alphabetical order. Thus, in the embodiment shown in FIG. 16, the name access function 550 reorders the name ID's (which are references to the navigation feature name records 262) in the list 554 numerically (e.g., smallest to largest). This results in arranging the name ID's in order so that the navigation feature name data records referenced by the references are in alphabetical order. Also, this results in arranging the ID's in order so that the navigation feature data records referenced by the ID's are accessed in the order in which they are stored in the database 162 and on the media 164.

In alternative embodiments, the order of the navigation feature data records 262 may not be implied by the ID's included in the list 554. If this is the case, the name access function 550 may refer to a cross reference index (such as one of the indices 254 shown in FIG. 5) in order to obtain the media order of the navigation feature name data records from the data in the ID's included in the list 554.

Referring still to FIG. 16, after the ID's from the list 554 are reordered, the navigation feature name data records 262 are accessed and obtained from the geographic database 162 (Step 572). When accessing the navigation feature name data records 262, at least the name information (262(2) in FIG. 7) from each record 262 is obtained. As the navigation feature names 262(2) are obtained from the geographic database 162, the navigation feature names are put into a list that conforms to the order specified by the list 554 received from the manager application (Step 576).

After the name access function 550 obtains all the navigation feature names from the geographic database 162, the navigable feature names are provided in a list 582 that forms the output of the name access function 550. The list 582 is returned by the name access function 550 to the manager application 155. The list 582 of navigable feature names returned to the manager application 155 may be further processed by programming in the manager application 155 to provide a preview of the solution route. The preview of the solution route may be presented to the end user via the user interface 131 in the form of audible instructions, visual textual instructions, visual graphical instructions, or any combinations of these or other types of information presentation. Using the list 582 of navigable feature names in the output from the name access function 550, the names of the roads in the solution route can be provided quickly to the end user in the route preview. In one embodiment, the route preview presents to the end user the road names in the solution route along with additional information, such as the heading, turn angle, an indication of whether the solution route includes a controlled access road, special traffic explication, a roundabout, a ferry, and so on. The route preview may be provided to the end user immediately or soon after the route calculation function 142 calculates the solution route. Preferably, the route preview is provided before the driver embarks on the calculated route.

The route preview does not include detailed maneuvering instructions about how to drive the solution route. As mentioned above, detailed maneuvering instructions are provided by other functions 151 in the route guidance application 144. However, the list of roads, turn angle, indications of controlled access roads etc., in the summary provided by the route preview function 150 provides valuable information to the end user. It is an advantage of the route preview feature that only the names of certain of the roads in the solution route are provided and not the detailed maneuvering instructions. By providing only certain of the names, the end user is informed of the solution route at a level of detail sufficient to understand the overall organization of the solution route without being given too much information about specific maneuvers needed along the way.

By providing a list of road names to the end user in a route preview prior to embarking on the calculated route, the end user is given a chance to reject the calculated route and possibly request calculation of an alternative route. For example, the end user may know that a portion of the solution route has slow traffic. Thus, by providing the end user with a preview of the solution route in the form of a list of the roads contained in the solution route, the end user can make a decision as soon as possible whether to accept the solution route.

III. Alternative Embodiments
A. First alternative embodiment

In the embodiment described above, each road segment data record 258 in the routing data 236 that represents a road that is referred to by a name on a road sign includes at least one reference ID (258(6) in FIG. 6) to a navigable feature data record 262 that contains the text string of the name. This allows a list of references to names of the roads in a solution route to be formed as the solution route is calculated. In a first alternative embodiment, each road segment data record in the routing data 236 that represents a road referred to by a road sign name includes the actual text of the name as an attribute in the road segment data record instead of just a reference to the name. FIG. 17 shows components of a road segment data entity according to this first alternative embodiment.

In FIG. 17, some of the components of a road segment data entity 658 are shown. The components of the road segment data entity 658 are similar to those shown in FIG. 6. The components of the road segment data record 658 in FIG. 17 include a segment ID 658(1), a restricted direction attribute 658(2), a speed limit or category attribute 658(3), a classification attribute 658(4), a rank attribute (658(5), endpoints 658(7), and so on. These components of the road segment data entity 658 shown in FIG. 17 may be similar or identical to those corresponding components described in connection with FIG. 6.

The road segment data entity 658 shown in FIG. 17 includes one or more names on road sign attributes 658(6). The names on road sign attributes 658(6) contain the actual text strings of the names by which the represented road segment is referred to by one or more road signs located along the represented road segment. For example, a road segment data record 658 that represents a portion of the road named "Higgins" includes as a component a name on road sign attribute 658(6) containing the text string "HIGGINS". In the embodiment shown in FIG. 17, the road segment data record 658 does not include a reference to the navigable feature name data 246.

The road segment data record 658 shown in FIG. 17 is used similarly to the embodiment of the road segment data record 258 shown in FIG. 6. The road segment data record 658 shown in FIG. 17 contains the data components needed for route calculation. The road segment data record 658 shown in FIG. 17 can be used by the route calculation application 142 (shown in FIGS. 2 and 11) to calculate a route. The route calculation application 142 evaluates road segments for potential inclusion in a solution route. As road segments are identified for inclusion in a solution route, the names on road sign data 658(6) for each represented road segment identified for inclusion in the solution route are stored in a temporary list along with the name(s) of the represented road segment. After the solution route is determined, this temporary list contains the names of all the road segments forming the solution route. This list of road names can be used to provide a route preview feature to the end user of the navigation system. According to this embodiment, the separate name access function 550 (described in FIG. 16) is not needed to separately access the navigable feature data 246 in order to obtain the names of the road segments included in the route preview list after the list is determined. Instead, the actual text of the names of all the road segments in the preview list can be included in the output of the route preview function.

Even though each road segment data record 658 that represents a road segment referred to by a name on a road sign includes the text of the name as an attribute 658(6), the name of the road is also contained in a navigable feature name data record 262 (in FIG. 7) included in the navigable feature name data 246 (in FIG. 5). By including the name of the road in the navigable feature name data 262, the name can be referenced by other functions in the programming 118. Thus, according to this alternative embodiment, the name of the road is included in at least two locations in the geographic database 162. Although this duplication of data may increase the overall size of the geographic database 162, certain functions (such as the route preview function) can be performed quickly.

B. Second alternative embodiment

Figure 18:
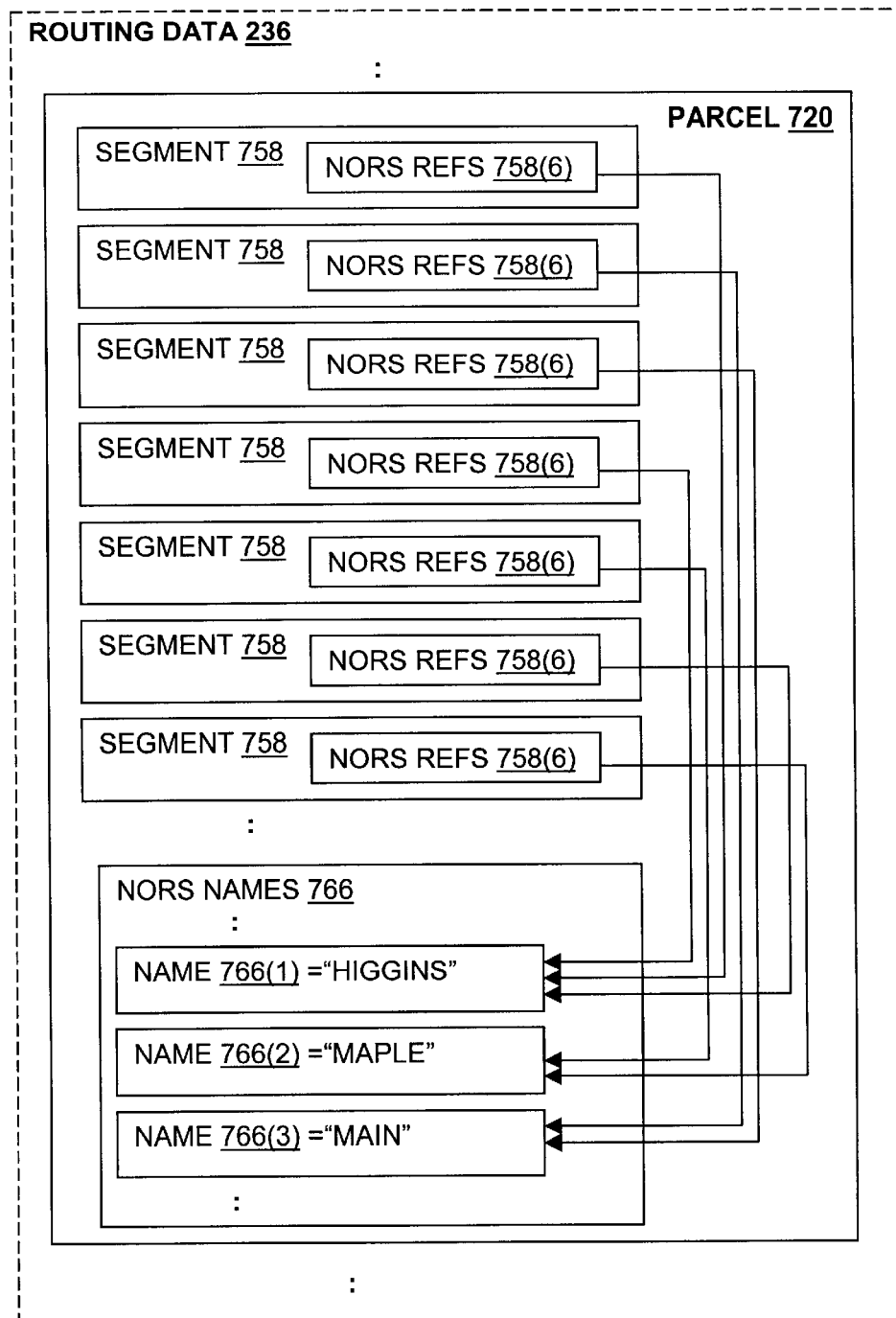
FIG. 18 is a block diagram that shows components of a parcel of routing data according to another alternative embodiment.

A second alternative embodiment is described in connection with FIG. 18. FIG. 18 is a diagram illustrating some of the data included in a parcel 720 of routing data 236. The parcel 720 shown in FIG. 18 may be similar to the parcels 320 described above in connection with FIG. 9. The parcel 720 of routing data 236 in FIG. 18 is one of a plurality of parcels of routing data 236 each of which may have a structure similar or identical to the parcel 720.

Like the parcels 320 of routing data 236 described in connection with the first embodiment, the parcel 720 of routing data shown in FIG. 18 includes a plurality of road segment data records 758. Each of the road segment data records 758 may be similar to the road segment records 258 described above. Each of the road segment data records 758 in the parcel 720 represents a road segment and contains navigation-related attributes (not shown in FIG. 18) that can be used by the route calculation application 142 (in FIG. 2) when calculating a route.

According to this embodiment, each of the road segment data records 758 that represents a road segment which is known by a name on a road sign contains one or more references 758(6). Each reference 758(6) points to data indicating the name by which the represented road segment is referred to by the sign along the represented road segment. The reference 758(6) points to string of text located within the routing data 236. More specifically, the reference 758(6) points to an entry in a portion of data 766 located within the same parcel 720 of routing data 236 as the road segment record 758 that includes the reference 758(6).

As mentioned above, a parcel typically includes many road segment data records. Within a parcel, several road segment data records 758 may represent separate portions of the same named road. According to the embodiment of FIG. 18, each road segment data record 758 within a parcel that represents a separate portion of the same named road may refer to the same entry in the portion of data 766 located within the parcel 720.

The embodiment of FIG. 18 can be used by a navigation system to provide a route preview feature. With the embodiment of FIG. 18, the route calculation function 142 calculates a route using the routing data 236. For each road segment in a solution route, the route calculation function 142 also stores the name on road sign text 766 referenced by the road segment data record that represents the road segment. The name on road sign text can be stored in the list that forms the output of the route calculation function. The actual names of the road segments can be included in the list during the route calculation process because the name on road sign data is available (i.e., in the portion 766) in the same parcel of data that includes the routing data records being accessed during route calculation. When the solution route has been calculated, the list includes the names of all the road segments included in the solution route. With the embodiment of FIG. 18, there is no need to separately access data records in the navigable feature name data 246 in order to obtain the actual names of the roads in the solution route.

An advantage of this embodiment is that the name of each road segment can be obtained quickly as a route is being calculated by the route calculation function 142. Since the route calculation function accesses the parcel of routing data 720 in order to obtain the navigation-related attributes of the represented road segment, by including the name of the road within the parcel of routing data allows the list of names of roads in the solution route to be developed quickly.

Like the previously described embodiment, the name of each road is also represented by a navigable feature name data record 262 (in FIG. 7) included in the navigable feature name data 246 (in FIG. 5). Thus, according to this alternative embodiment, the names of some roads are included in at least two locations in the geographic database 162. Although this duplication of data may increase the overall size of the geographic database 162, certain functions (such as the route preview function) can be performed quickly.

C. Other alternatives

In some of the embodiments described above, the names provided by the route preview function are those names by which the roads are referred to by signs along the roads. This is intended to include in the route preview function those names by which the roads are most commonly known. The name of a road provided by the route preview function does not have to be a name on road sign but any name by which the road is known, preferably the most common name.

In the embodiments described above, the navigation applications were described in connection with navigation system, such as in-vehicle navigation systems. It is understood that the embodiments can be implemented on various platforms and/or environments, including personal computers, personal digital assistants, network environments, the Internet, telephone-based systems, and so on.

It is intended that the foregoing detailed description be regarded as illustrative rather than limiting and that it is understood that the following claims including all equivalents are intended to define the scope of the invention.

We claim:

1. In a navigation system that includes hardware and software components and that uses a geographic database stored on a computer-readable medium, a combination comprising:

a route calculation feature wherein a data output representing a solution route between an origin and a destination is determined by using a first portion of the geographic database that contains routing data, and a route guidance feature wherein detailed maneuvering instructions for following the solution route are provided one at a time to a user of the navigation system by using a second portion of the geographic database that contains maneuvering data;

a route preview feature wherein a summary of the solution route is provided to the user prior to the detailed maneuvering instructions, wherein the route preview feature includes:

a first routine that obtains the data output representing the solution route;

a second routine that evaluates entries in the data output representing the solution route to determine whether a route preview event is indicated; and a third routine that stores data for each entry in the data output that represents the solution route for which a route preview event is indicated, wherein the data stored for each entry includes a reference to a data entity that contains a name by which a road in the solution route associated with the entry is known.

2. A method of providing a route preview of a route calculated by a navigation application, the method comprising:

calculating a solution route between an origin and a destination using a geographic database, wherein said solution route is represented by a first list of data entities from said geographic database, wherein the data entities in said first list represent segments of roads that form a continuous route that conforms to known legal traffic restrictions between said origin and said destination; and as said solution route is being calculated, storing an indication of a name by which each road segment represented in said first list is known.

3. The method of claim 2 further comprising the step of:

providing a user of said navigation application with a preview of said solution route, wherein said preview includes names by which the roads in said solution route are known.

4. The method of claim 2 wherein said indication is a reference to a portion of the geographic database that contains names of geographic features.

5. The method of claim 2 further comprising the steps of:

providing a list that contains data representing each road included in said solution route to a function;

evaluating the data representing each road included said solution route;

forming route preview data structures based upon said step of evaluating, wherein the route preview data structures contain indications of the names by which roads in said solution route are known; and using the route preview data structures to provide a preview of the solution route to a user of the navigation application.

6. The method of claim 5 further comprising the step of:

prior to using the route preview data structures to provide a preview of the solution route to the user, obtaining from the geographic database the name of the road associated with each of the indications contained in the route preview data structures.

7. The method of claim 6 further comprising the step of:

prior to obtaining the name of the road associated with each of the indications contained in the route preview data structures from the geographic database, reordering the indications.

8. The method of claim 7 wherein the step of reordering arranges the indications in media order.

9. The method of claim 7 wherein the step of reordering arranges the indications in numeric order.

10. The method of claim 7 wherein the step of reordering arranges the indications in so that the names are obtained in alphabetical order.

11. The method of claim 6 wherein the step of obtaining the name of the road associated with each of the indications contained in the route preview data structures is performed according to an order formed by the reordering step.

12. A method of operation for a navigation system that includes hardware and software components and that uses a geographic database stored on a computer-readable medium, the method comprising:

using a first portion of the geographic database that contains routing data to determine a solution route between an origin and a destination, wherein the solution route is represented by an output that contains routing data;

using a second portion of the geographic database that contains maneuvering data to provide a user of the navigation system with detailed maneuvering instructions one at a time for following the solution route;

providing a preview of the solution route to the user before the maneuvering instructions are provided, wherein the preview is formed by evaluating the data representing the solution route to determine entries for the preview; and storing references to a third portion of the geographic database that contains names of the roads represented by the routing data in the first portion, wherein the references are contained in said data representing the solution route.

13. The method of claim 12 wherein said evaluating step comprises:

if a change of names occurs in the solution route, forming an entry for the preview that describes the change of names.

14. The method of claim 12 wherein said evaluating step comprises:

if a controlled access road is entered in the solution route, forming an entry for the preview that indicates that a controlled access road is entered.

15. The method of claim 12 wherein said evaluating step comprises:

if a roundabout is entered in the solution route, forming an entry for the preview that indicates that a roundabout is entered.

16. The invention of claim 1 wherein said second routine determines that a route preview event is indicated if a change of road names occurs in the solution route.

17. The invention of claim 1 wherein said second routine determines that a route preview event is indicated if a controlled access road is entered in the solution route.

18. The invention of claim 1 wherein said second routine determines that a route preview event is indicated if a roundabout is entered in the solution route.

19. The invention of claim 1 wherein said route preview features further comprises:

a fourth routine that reorders the references to the data entities that contain names in media order.

20. The invention of claim 1 wherein said route preview features further comprises:

a fourth routine that reorders the references to the data entities that contain names in alphabetical order.

* * * * *